United States Patent [19]

Haneda et al.

[11] Patent Number: 5,493,411
[45] Date of Patent: Feb. 20, 1996

[54] IMAGE FORMING APPARATUS THAT MODULATES IMAGE DENSITY DATA

[75] Inventors: Satoshi Haneda; Yoshiyuki Ichihara; Takashi Hasebe; Tetsuya Niitsuma, all of Tokyo, Japan

[73] Assignee: Konica Corporation, Tokyo, Japan

[21] Appl. No.: 468,386

[22] Filed: Jun. 6, 1995

Related U.S. Application Data

[63] Continuation of Ser. No. 969,345, Oct. 30, 1992, abandoned.

[30] Foreign Application Priority Data

| Nov. 1, 1991 | [JP] | Japan | 3-287993 |
| Dec. 13, 1991 | [JP] | Japan | 3-330737 |

[51] Int. Cl.$^6$ .................. H04N 1/40; H04N 1/23
[52] U.S. Cl. .................. 358/298; 358/300; 358/462
[58] Field of Search .................. 358/298, 300, 358/448, 462, 534, 538, 453; 382/254, 276, 176, 205; 347/129, 132, 135, 141, 225, 232, 254

[56] References Cited

U.S. PATENT DOCUMENTS

| 3,646,262 | 2/1972 | Moe | 178/6.7 R |
| 4,258,393 | 3/1981 | Ejiri et al. | 358/283 |
| 4,450,485 | 5/1984 | Oshikoshi et al. | 358/298 |
| 4,782,398 | 11/1988 | Mita | 358/280 |
| 4,831,392 | 5/1989 | Dei | 364/519 |
| 4,868,684 | 9/1989 | Suzuki | 358/455 |
| 5,050,000 | 9/1991 | Ng | 358/298 |
| 5,172,132 | 12/1992 | Haneda et al. | 346/108 X |

FOREIGN PATENT DOCUMENTS

| 0213891 | 3/1987 | European Pat. Off. | H04N 1/46 |
| 2591367 | 6/1987 | France | H04N 1/00 |
| 63-44662 | 2/1988 | Japan | G03G 5/05 |

Primary Examiner—Peter S. Wong
Assistant Examiner—Eric Frahm
Attorney, Agent, or Firm—Finnegan, Henderson, Farabow, Garrett & Dunner

[57] ABSTRACT

In an image forming machine, density data of small pixels in an objective pixel determined according to density of pixels adjoining the objective pixels, the objective pixel determines a recording position for each color based on density distribution of the adjoining pixels when the recording position of each color is modulated in the primary scanning direction and secondary scanning direction based on density distribution of both the objective pixel and the adjoining pixels. Further, there are provided an image discriminator for image judgment on the objective pixel and a modulator for modulating a recording position using a reference wave with a long cycle when an image is judged to be a halftone image area under a reference wave with a short cycle when an image is judged to be a character image area.

7 Claims, 24 Drawing Sheets

| m1 | m2 | m3 |
|----|----|----|
| m4 | m5 | m6 |
| m7 | m8 | m9 |

| S1 | S2 | S3 |
|----|----|----|
| S4 | S5 | S6 |
| S7 | S8 | S9 |

|  |  |  |
|---|---|---|
| m1=226 | m2=251 | m3=8 |
| m4=200 | m5=45 | m6=7 |
| m7=190 | m8=8 | m9=2 | m5

|  |  |  |
|---|---|---|
| S1=71 | S2=76 | S3=24 |
| S4=65 | S5=32 | S6=24 |
| S7=63 | S8=24 | S9=22 |

▨ : AREA RELATING TO S1    ≡ : AREA RELATING TO S2
▥ : AREA RELATING TO S3    ▨ : AREA RELATING TO S4

▨ : AREA RELATING TO S1   ▤ : AREA RELATING TO S2
▥ : AREA RELATING TO S3   ▧ : AREA RELATING TO S4

FIG. 23(b)

IMAGE FORMING APPARATUS THAT MODULATES IMAGE DENSITY DATA

This application is a continuation of application Ser. No. 07/969,345, filed Oct. 30, 1992, now abandoned.

BACKGROUND OF THE INVENTION

In the present invention, distribution of adjoining pixels is reflected in density distribution of objective recording pixels so that high quality recording can be conducted. The present invention relates to a color image forming apparatus in which: one matrix pixel image data is divided into small pixels m×n (the width×the length) considering the adjoining pixel data, and after that, the center of gravity of each line is found; the phase of the reference wave is deviated according to the center of gravity; and dot recording composed of n small scanning lines is conducted by the modulated signal of the pixel density data modulated by the reference wave signal so that a character and a halftone image can be reproduced. The recording apparatus of the present invention is used for a printing apparatus or a displaying apparatus.

In the field of image forming apparatus using the electrophotographic method, a digital halftone image is reproduced in the following manner: an original image is read by a scanner to get on image signal; and image density data in which the image signal is gradation-corrected, A/D converted, and shading-corrected, is modulated by a reference signal and thus a digital image is obtained.

When an original image is read by the scanner, an edge portion of the image is read in a halftone density due to the aperture of a solid state image pick-up element installed in the scanner. When a latent image is formed on a photoreceptor with an image density data obtained from image signals, recording pixels corresponding to the edge portion of the latent image are recorded in recording pixels on an average basis. Therefore, the sharpness of the recorded image is lowered. For this phenomenon, in the past, there has been known a method to apply an MTF correction by means of image-sharpening by the use of a differential filter, or a Laplacian filter on image signals. In this method, however, edge portions only are enhanced, and uniformity of halftone images is relatively lowered.

On the other hand, even when an interpolated character or figure is formed from computer graphic (C.G.) data or font data, a similar problem is caused. That is, when the edge portion is interpolated smoothly with the intermediate density using the interpolated data, a recording pixel corresponding to the edge portion is recorded in pixels as average density, and thereby the resolution is lowered in the same way as the aforementioned.

For the reasons mentioned above, intermediate density processing, which effectively operates on the edge portion of the image, is required.

Further, when intermediate density processing is conducted on each color in a color image forming apparatus, there occurs the problem in which color tone is varied, or characters become not sharp.

Further, the invention relates to an image forming apparatus wherein dot-recording is made for reproduction of characters and halftone images by a laser diode oscillated by modulation signals in which density data are modulated by reference signals.

SUMMARY OF THE INVENTION

In view of the foregoing problems, an object of the present invention is to provide an image forming apparatus in which resolution of the image, which is formed from scanner data, C.G data, font data, or the like, is improved, and high quality images having no longitudinal streaks are recorded.

In the first constitution of an image forming apparatus of the invention capable of conducting high density pixel recording with density data of small pixels in an objective pixel determined based on density data of pixels adjoining the objective pixel, the objective pixel determines a recording position for each color based on density distribution of the adjoining pixels when the recording position of each color is modulated in the primary scanning direction and secondary scanning direction based on density distribution of both the objective pixel and the adjoining pixels. In this type of image forming, preferable resolution and gradation matching an image can be realized by making the cycle of a reference wave to be variable corresponding to the image. Further, in the first constitution of an image forming apparatus of the invention, there are provided a means for image judgment on the objective pixel mentioned above and a means which modulates a recording position using a reference wave with a long cycle when an image is judged to be a halftone area under the image judgment, and modulates the recording position using a reference wave with a short cycle when an image is judged to be a character area.

In the second constitution of an image forming apparatus of the invention, a plurality of scanning operations are conducted for a unit pixel and an image is formed with a scanning position deviated by a selectable reference wave for a character reproduction area and with a scanning width changed by a selectable reference wave for a halftone reproduction area.

With regard to a reference wave cycle for the halftone reproduction area mentioned above, the aforementioned image forming apparatus wherein a plurality of pixels are used and a phase of a reference wave differs for each color is a preferable embodiment.

BRIEF DESCRIPTION OF THE DRAWINGS

FIGS. 23(a)–23(h) are timing charts showing each signal in the case of a character reproduction area for a modulation signal generation circuit in the third example.

DETAILED DESCRIPTION OF THE PREFERRED EMBODIMENTS

Figure 4:
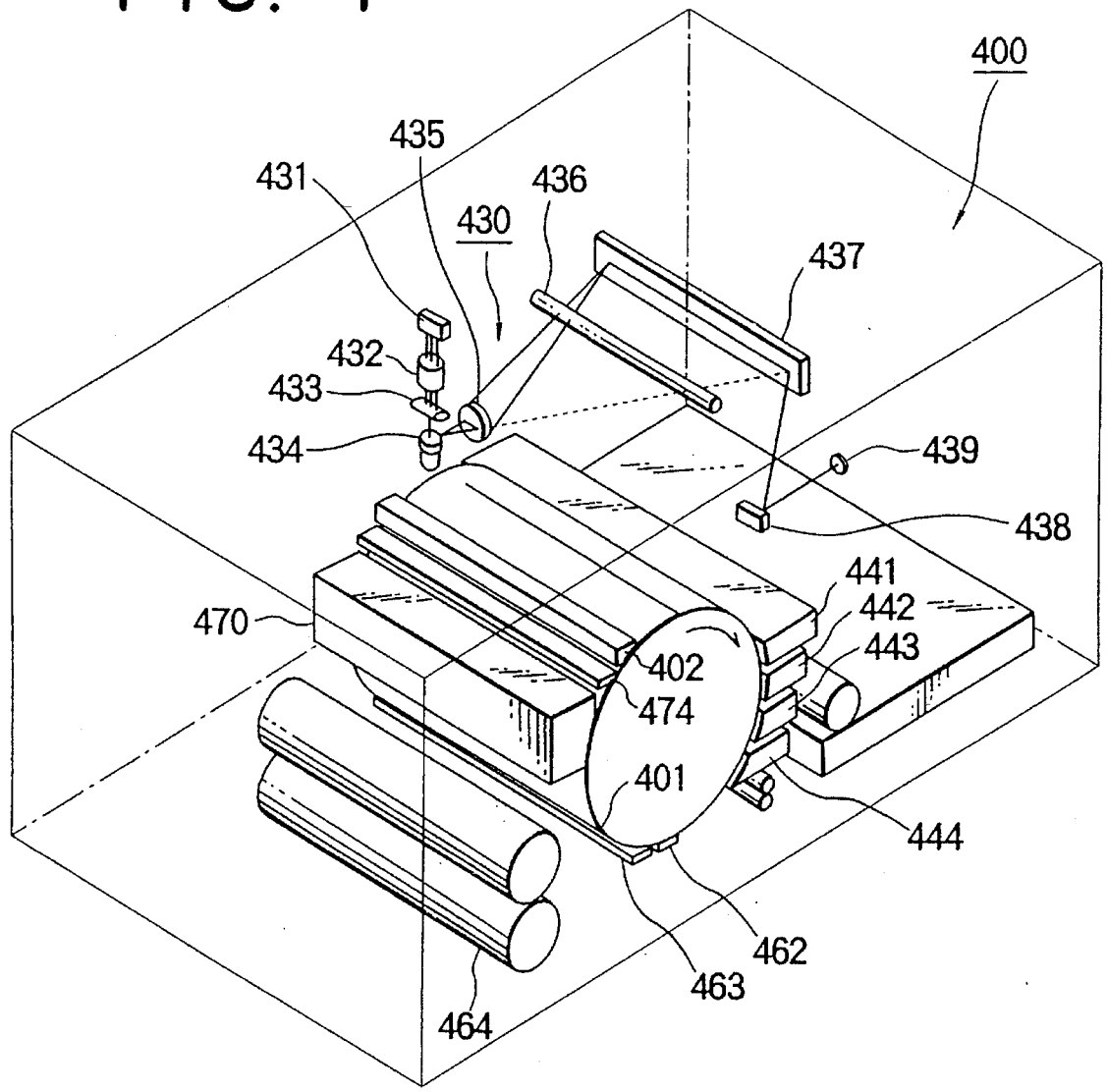
FIG. 4 is a perspective view showing the general constitution of an image forming apparatus of the invention.

The constitution of image forming apparatus 400 which is an example of the invention will be explained as follows. FIG. 4 is a perspective view showing general constitution of the image forming apparatus in the present example.

A color image can be obtained by the image forming apparatus 400 as follows:

After a photoreceptor has been uniformly charged, a dot-shaped electrostatic latent image is formed thereon by a spot light which has been pulse-modulated in accordance with a modulation signal obtained through differential amplification between an analog image density signal which can be obtained by D/A-converting a digital image density signal sent from a computer or a scanner, and a reference signal, and this electrostatic latent image is reversely developed by toner so that a dot-shaped toner image is formed. The aforementioned charging, exposing and developing processes are repeatedly conducted so that a color toner image can be formed on the surface of a photoreceptor, and then the obtained color toner image is transferred, separated and fixed.

The image forming apparatus 400 is composed of, a drum-shaped photoreceptor 401 (hereinafter, referred to as a photoreceptor) which is rotated in the direction of an arrow, a scorotron charger 402 which gives a uniform electric charge on the aforementioned photoreceptor 401, an optical scanning system 430, developing units 441–444 which are loaded with yellow, magenta, cyan and black toners, a scorotron transfer unit 462, a separator 463, a fixing roller 464, a cleaning unit 470, and a discharger 474.

Figure 14:
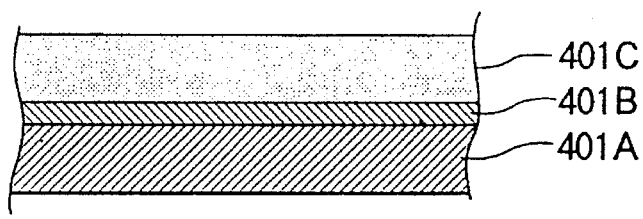
FIG. 14 is a cross-sectional view showing the concrete example of constitution for the high γ photoreceptor used in the present example.

FIG. 14 is a diagram showing an example of a specific structure of a high γ photoreceptor 401 used in the present example.

As illustrated in FIG. 14, the photoreceptor 401 is composed of a conductive support 401A, an intermediate layer 401B, and a photosensitive layer 401C. The thickness of the photosensitive layer 401C is 5–100 μm, and preferably 10–50 μm. The photoreceptor 401 is made of an aluminum drum-shaped conductive support 401A. On the aforementioned support 401A is formed the intermediate layer 401B of 0.1 μm in thickness, which is made from ethylene-vinyl acetate, and on the intermediate layer 401B is provided the photosensitive layer 401C, the thickness of which is 35 μm.

A drum of 150 mm in diameter which is made from aluminum, steel or copper is used for the conductive support 401A. A belt-shaped conductive support is also used which is made in such a manner that a metallic layer is vapor-deposited or laminated on a paper or a plastic film. A metallic belt made from nickel by means of electroforming may be also used. It is preferable that the intermediate layer 401B can endure a high potential charging of ±500–±2000 V as a photoreceptor, and it is further preferable that the intermediate layer 401B is provided with a hall mobility so that the flow of electrons from the conductive support 401C can be prevented when it has been charged positive, and so that an excellent light decay characteristic can be obtained due to the avalanche effect. Therefore, it is preferable that a positive charging type of electric charge conveyance material which has been disclosed in Japanese Patent Application 188975/1986 by the inventors, is added to the intermediate layer 401B by not more than 10 weight percent.

The following resins which are commonly used in a light sensitive layer for electrophotography use, are used for the intermediate layer 401B.

(1) Vinyl polymer such as polyvinyl alcohol (poval), polyvinyl methyl ether, polyvinyl ethyl ether, and the like (2) Vinyl polymer containing nitrogen such as polyvinyl amine, poly-N-vinyl imidazole, polyvinyl pyridine, polyvinyl pyrrolidone-vinyl acetate copolymer, and the like (3) Polyether polymer such as polyethylene oxide, polyethylene glycol, polypropylene glycol, and the like (4) Acrylic acid polymer such as polyacrylic acid and its polymer, polyacrylic amide, poly-β-hydroxy ethyacrylate, and the like (5) Metaacrylic acid polymer such as polymetaacrylic acid and its salt, polymetaacrylic amide, polyhydroxy propylmetaacrylate, and the like (6) Ether cellulose polymer such as methyl cellulose, ethyl cellulose, carboxymethyl cellulose, hydroxymethyl cellulose, hydroxypropylmethyl cellulose, and the like (7) Polyethylene imine polymer such as polyethylene imine and the like (8) Polyamino acid such as polyalanine, polyserine, poly-L-glutamic acid, poly-(hydroxyethyl)-L-glutamine, poly-δ-carboxymethyl-L-cysteine,polyproline, lysine-thylosin copolymer, glutamic acid-lysin-alanine copolymer, silkfibroin, casein, and the like (9) Starch and its derivative such as starch acetate, hydroxyne ethyl starch, starch acetate, hydroxyethyl starch, amine starch, phosphate starch, and the like

(10) Polymer soluble in a mixed solvent of water and alcohol such as soluble nylon of polyamide, methoxymethyl nylon (8 type nylon), and the like.

The photosensitive layer 401C is formed by coating a coating agent on an intermediate layer and after that the coated layer is dried and heat-treated if necessary, wherein the coating agent is prepared as follows: basically, electric charge conveyance material is not added into the photosensitive layer 401C; phthalocyanine fine particles of 0.1–1 μm in diameter composed of a photoconductive pigment, an antioxidant and a binder resin are mixed and dispersed in a solvent.

In the case where a photoconductive material and electric charge conveyance material are jointly used, a photosensitive layer is composed as follows: a photoconductive material composed of a phtoconductive pigment and a small amount of electric charge conveyance material, the amount of which is not more than $1/5$ of the aforementioned photoconductive pigment, or preferably $1/1000$–$1/10$ (weight percent) of the pigment, and an antioxidant are dispersed in a binder resin. When a high γ photoreceptor described above is utilized, a sharp latent image can be formed although the diameter of a beam is spread, so that a recording of high resolution can be effectively conducted.

In this embodiment, color toner images are superimposed on a photoreceptor. Accordingly, a photoreceptor, the spectral sensitivity of which is on the infrared side, and a semiconductor laser of infrared light are used so that the beam sent from the optical scanning system can not shade the color toner image.

The light decay characteristic of the high γ photoreceptor of the present invention will be explained as follows.

Figure 13:
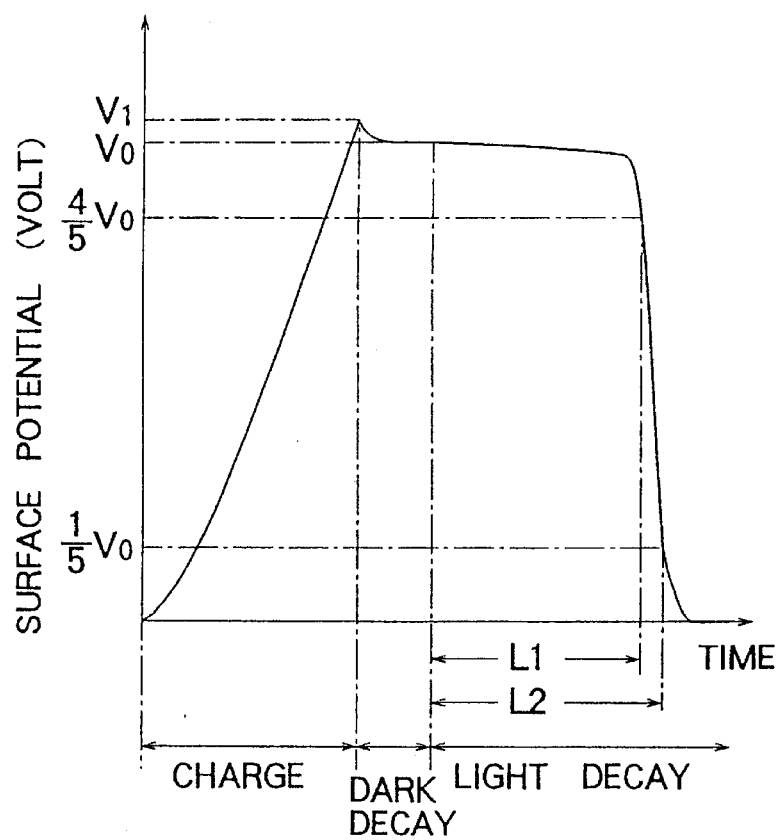
FIG. 13 is a graph showing the characteristics of a high γ photoreceptor used in the present example.

FIG. 13 is a graph showing the outline of a high γ photoreceptor. In FIG. 13, $V_1$ is a charging potential (V), $V_0$ is an initial potential (V) before exposure, $L_1$ is the amount (μJ/cm$^2$) of light of the illuminated laser beam which is required to reduce initial potential $V_0$ to $4/5$, and $L_2$ is the amount (μJ/cm$^2$) of light of the illuminated laser beam which is required to reduce initial potential $V_0$ to $1/5$.

A preferable range of $L_2/L_1$ is $1.0 < L2/L1 \leq 1.5$.

In this embodiment, $V_1=1000(V)$, $V_0=950(V)$, and $L_2/L_1=1.2$. The photoreceptor potential of the exposure section is 10 V.

Assume that the light sensitivity is $E_{1/2}$ at the position corresponding to the middle period of exposure in which the initial potential ($V_0$) is decayed to $1/2$, and that the light sensitivity is $E_{9/10}$ at the position corresponding to the initial period of exposure in which the initial potential ($V_0$) is decayed to $9/10$, then a photoconductive semiconductor satisfying the following inequality is selected.

$$(E_{1/2})/(E_{9/10}) \geq 2$$

Preferably $$(E_{1/2})/(E_{9/10}) \geq 5$$

In this case, light sensitivity is defined as the absolute value of potential drop with regard to a minute amount of exposure.

In the light decay curve of the photoreceptor 401, the absolute value of the differential coefficient of the potential characteristic is decayed a little when the amount of light is small, and decayed sharply as the amount of light is increased as shown in FIG. 13. Specifically, in the initial period of exposure of the light decay curve as shown in FIG. 13, the sensitivity characteristic is bad for a certain period of time $L_1$. However, in the middle period of exposure and thereafter to the end, the light sensitivity is highly increased so that the light decay curve goes downward almost linearly, in other words, the photoreceptor shows a super-high γ characteristic. It can be considered that the photoreceptor 401 acquires a high γ characteristic using an avalanche phenomenon under a high charging potential of +500–+200 V. It can be considered as follows. That is, the carrier generated on the surface of the photoconductive pigment in the initial stage of exposure, is effectively trapped by an interface layer between the pigment and coated resin, so that light decay is positively restricted. As a result, a very sharp avalanche phenomenon is caused in the middle stage of exposure and thereafter.

Next, a color image forming apparatus of the present invention will be explained as follows. In the color image forming apparatus, an objective matrix pixel of the image density data is composed of small pixels m×n (width× length), and a distribution of the density data of adjoining pixels including the objective pixel, is replaced with the distribution of small pixels m×n in one pixel, and the image is formed by the following method: a position in which dots of n rows are written is displaced when a phase of a reference wave in each row of small pixels is displaced according to image density data of small pixels obtained by distributing data of the objective pixel multiplied by constant P corresponding to the distribution. Displacement of the position in which dots are written will be referred to as recording position modulation, hereinafter. Further, processing to convert the image density data of the objective pixel into the image density data of small pixels obtained by dividing the objective pixel into m×n, will be referred to as resolution enhancing processing (RE processing), hereinafter. Due to RE processing, high density recording can be conducted. In this case, a high γ photoreceptor is specifically effective in order to form a latent image corresponding exactly to the reference wave.

In this invention, RE processing is conducted when ① the image density data of the objective pixel is not less than a first threshold value, that is, not less than the specific density, namely the first threshold value. In many portions of an area corresponding to a highlight portion, RE processing is not conducted on a background portion of a document, and small pixels m×n are set to have a uniform density. In the case of CRT, this data display can be possible.

However, in the case of laser recording which will be described later, it is difficult to display the data uniformly, and therefore, the reference wave whose density center exists in the center of the image density, is selected. Due to the aforementioned, uniformity in the highlight portion can be kept, and a noisy image can be prevented from occurring.

② In the case of high density and a steep density gradient, when a reference wave whose density recording position does not exist in the center is selected, dots are formed in the manner that they overlap with the adjoining pixel.

In order to prevent a density change and recording dot blocking between pixels, when the image density data of the objective pixel is not less than a specific second threshold value, and also in a high density portion, a reference wave whose density center exists in the center of the image density, is selected.

Since a uniform display can be conducted in the case of CRT, the densities of small pixels m×n are processed as a uniform density. That is, RE processing is not conducted.

In a color image forming apparatus in which high density image recording is conducted according to density distribution data in the objective pixel which is determined corresponding to density data of the pixels adjoining the objective pixel, a color image forming apparatus which is characterized as follows is preferable: when a specific density data of the objective pixel is not less than the first threshold value, recording position modulation is conducted according to the determined density distribution; or when a specific density data of the pixel is not more than the second threshold value recording position modulation is conducted according to the determined density distribution.

Figures 5A, 5B:
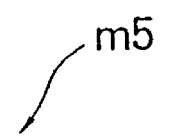
FIGS. 5(a) and 5(b) are diagrams illustrating the RE process used for a determination of a reference wave phase.

FIG. 5(a) is a plan view in which the adjoining pixels including the objective pixel m5 are expressed as m1 to m9 when the objective pixel is defined as m5, and the objective pixel m5 is divided into 3×3 small pixels. FIG. 5(b) is an enlarged view in which each small pixel is expressed by s1 to s9 when the objective pixel is divided into small pixels of 3×3. m1 to m9 and s1 to s9 also express the density of each portion.

RE processing will be explained in detail as follows. Taking the example of the case where the objective pixel m5 is divided into 3×3 small pixels, density of a small pixel si is determined by the following equation.

$$si = (9 \times m5 \times P \times mi/A) + (1-P) \times m5$$

Where i=1, 2, . . . , 9, and P is a constant, which is called strength for RE processing, and in which the range of 0.1 to 0.9 is used, and A is the sum total of m1 to m9.

In the above equation, a term of (9×m5×P×mi/A) expresses a density in which the density of the objective pixel m5 multiplied by P is distributed to each small pixel according to density ratio of the adjoining pixels, and the term (1−P)×m5 expresses a density in which the residual density of the objective pixel m5 is distributed equally to each small pixel, so that an element of unsharpness is taken into the equation.

Figures 6A, 6B:
FIG. 6(a) and 6(b) are diagrams showing an example wherein an objective pixel of the RE process is divided into the number of 3×3 and P is assumed to be 0.5 (P=0.5).
Figure 7A:
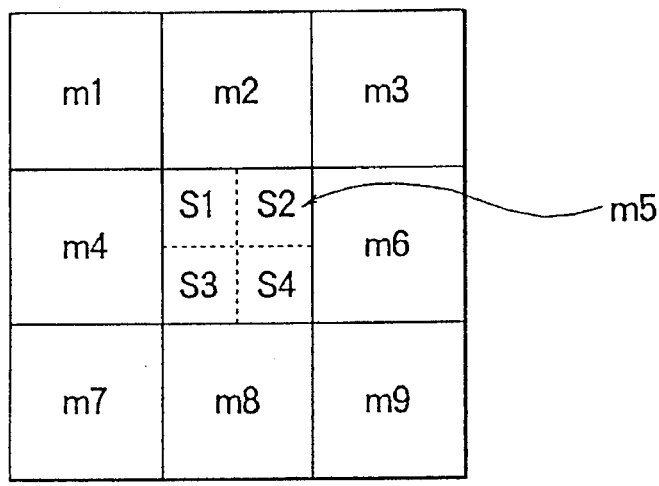
FIGS. 7(a) and 7(b) are diagrams showing an example wherein an objective pixel for the RE process is divided into the number of 2×2.
Figure 7B:
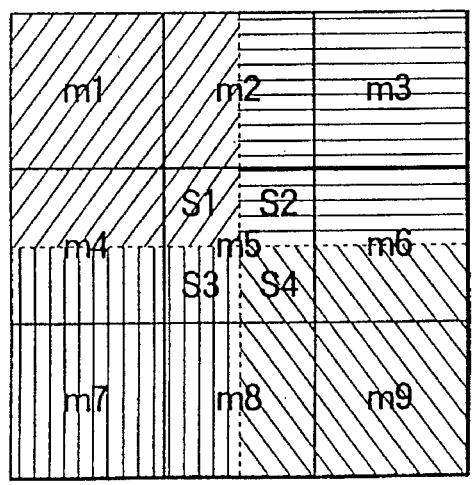

FIGS. 6(i a) and 6(b) are illustrations showing an example in which the objective pixel m5 is divided into 3×3 small pixels, and P=0.5. FIG. 6(a) is an illustration showing an example of the density distribution of the adjoining pixels including the objective pixel m5. FIG. 6 (b) is an illustration showing the density distribution in the objective pixel m5 which is calculated by P=0.5.

FIGS. 7(a), 7(b) and 8(a), 8(b) show an example in which the objective pixel m5 is divided into 2×2 small pixels.

FIG. 7 (a) is an illustration showing an example in which the objective pixel m5 is divided into 2×2 small pixels. FIG. 7 (b) is an illustration showing an example of the adjoining pixels relating to small pixels s1 to s4 in the objective pixel.

Density of s1, s2, s3, and s4 is calculated according to Equation 1.

(Equation 1)
$$s1 = \frac{4m1 + 2(m2 + m4) + m5}{A} \times m5 \times P + (1-P) \times m5$$

-continued
$$s2 = \frac{4m3 + 2(m2 + m6) + m5}{A} \times m5 \times P + (1-P) \times m5$$

$$s3 = \frac{4m7 + 2(m4 + m8) + m5}{A} \times m5 \times P + (1-P) \times m5$$

$$s4 = \frac{4m9 + 2(m6 + m8) + m5}{A} \times m5 \times P + (1-P) \times m5$$

where A is the total sum of m1 to m9.

Figure 8A:
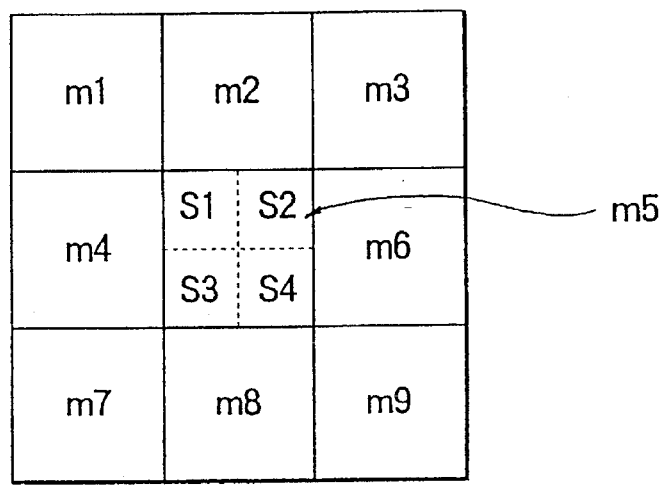
FIGS. 8(a) and 8(b) are other examples showing the same occasion as in FIGS. 7(a) and 7(b).
Figure 8B:
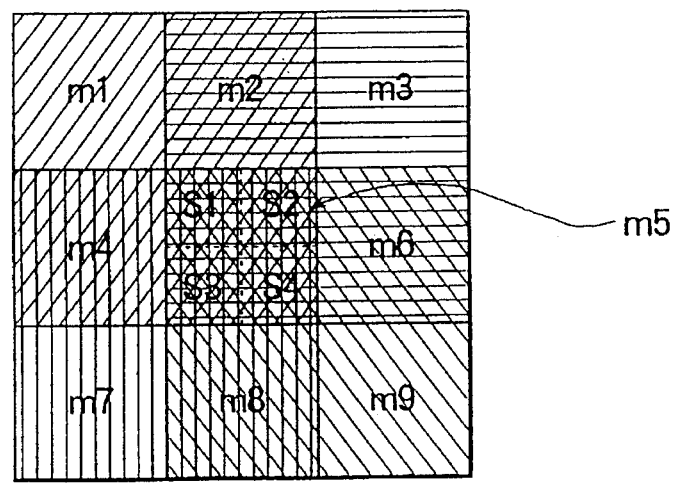

FIG. 8(a) is an illustration showing another example in which the objective pixel m5 is divided into 2×2 small pixels. FIG. 8(b) is an illustration showing another example of the adjoining pixels relating to small pixels s1 to s4 in the objective pixel. Density calculation of s1, s2, s3, and s4 is conducted according to Equation 2.

(Equaiton 2)
$$s1 = \frac{m1 + m2 + m4 + m5}{A} \times \frac{9}{4} \times m5 \times P + (1-P) \times m5$$

$$s2 = \frac{m2 + m3 + m5 + m6}{A} \times \frac{9}{4} \times m5 \times P + (1-P) \times m5$$

$$s3 = \frac{m4 + m5 + m7 + m8}{A} \times \frac{9}{4} \times m5 \times P + (1-P) \times m5$$

$$s4 = \frac{m5 + m6 + m8 + m9}{A} \times \frac{9}{4} \times m5 \times P + (1-P) \times m5$$

where A is the total sum of m1 to m9.

Figure 1:
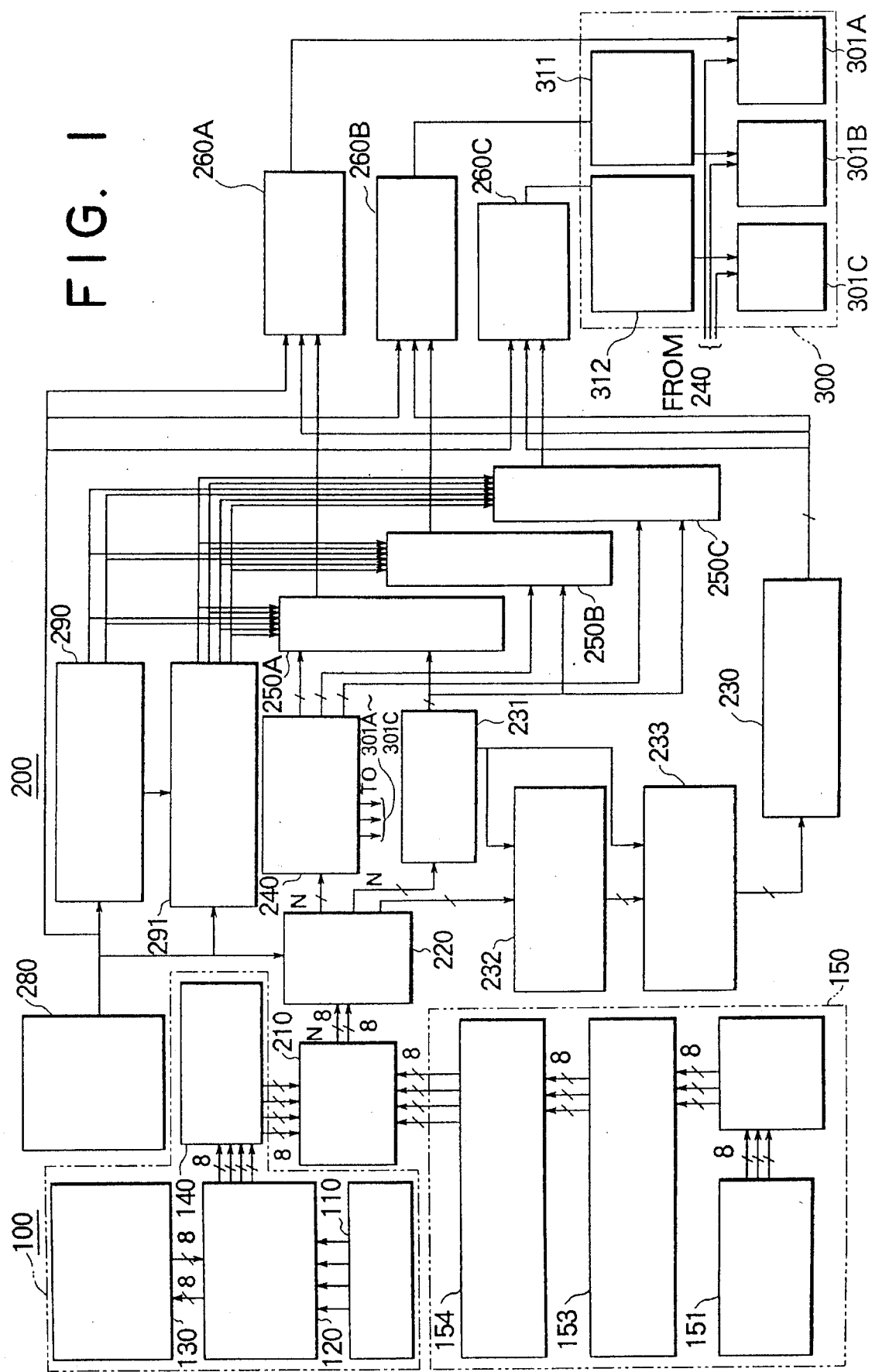
FIG. 1 is a block diagram of an image processing circuit in the first example of an image forming apparatus of the invention.
Figure 2:
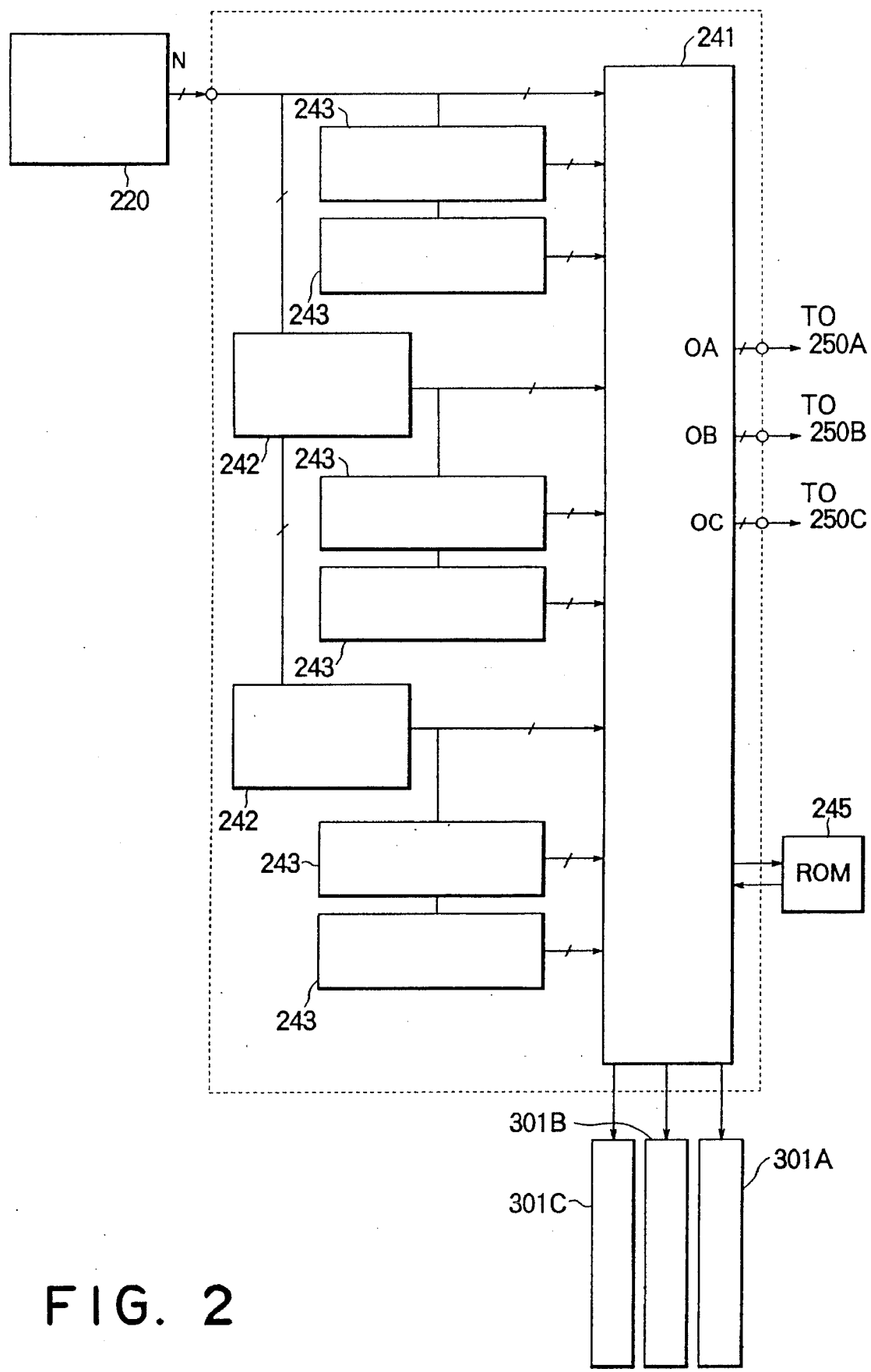
FIG. 2 is a block diagram showing an example of a determination circuit for a reference wave phase in the circuit shown in FIG. 1.
Figure 3:
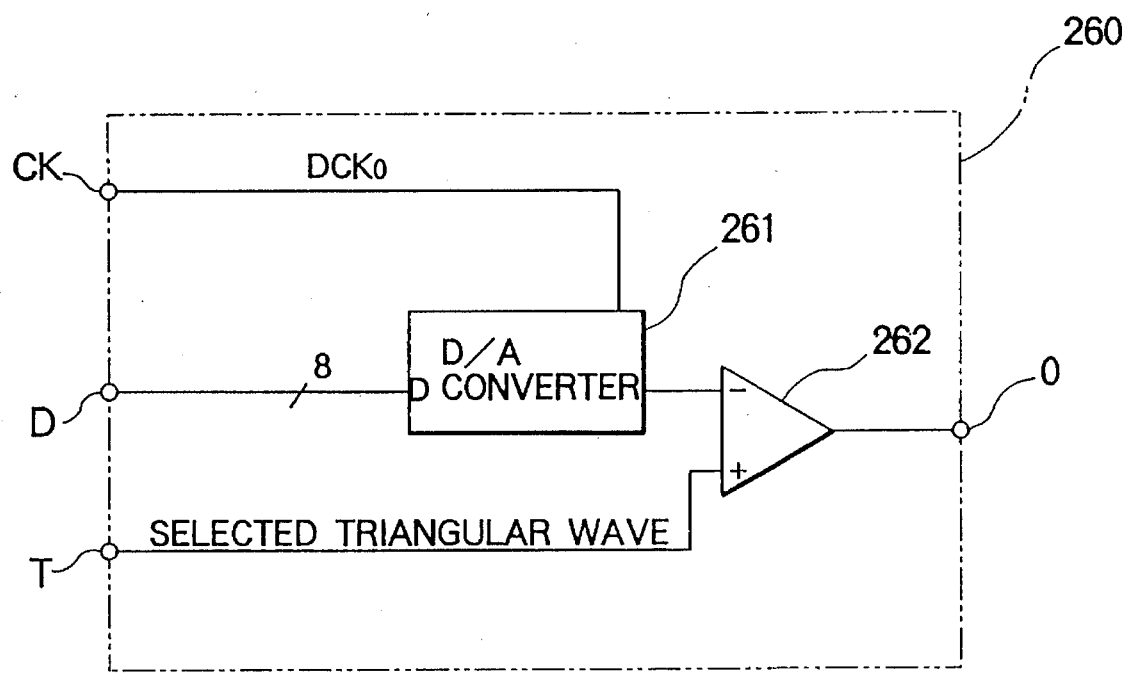
FIG. 3 is a block diagram showing an example of a modulation circuit in the circuit shown in FIG. 1.

FIG. 1 is a block diagram showing an example of an image processing circuit which is used in a color image forming apparatus of the present invention (an example in which the objective pixel is divided into 3×3). FIG. 2 is a block diagram showing a circuit for determining a reference wave phase and, FIG. 3 is a block diagram showing a modulation circuit in the present example.

An image processing circuit 1000 of this embodiment is a circuit composing a drive circuit of an optical scanning system. The image processing circuit 1000 is composed of an image data processing circuit 100, a modulation signal generating circuit 200, and a raster scanning circuit 300.

The image data processing circuit 100 is a circuit to interpolate the edge portion of font data and output the obtained data. The image data processing circuit 100 is composed of an input circuit 110, font data generating circuit 120, font data storing circuit 130, and interpolation data generating circuit 140. A character code signal, size code signal, position code signal, and color code signal are sent from the input circuit 110 to the font data generating circuit 120. The font data generating circuit 120 selects an address signal from 4 kinds of input signals and sends the selected signal to the font data storing circuit 130. The font data storing circuit 130 sends font data corresponding to the address signal to the font data generating circuit 120. The font data generating circuit 120 sends the font data to the interpolation data generating circuit 140. The interpolation data generating circuit 140 interpolates a zig-zag and jump of the image density data which are caused on the edge of font data using an intermediate density, and sends the interpolated data to the image density data storing circuit 210 composed of a frame memory. Concerning the color to be generated, the corresponding data is converted to the density data of yellow (Y), magenta (M), cyan (C), and black (BK) in accordance with a color code. In the way described above, the font is bit-map-developed in each frame memory under the condition that the shape is the same and the density ratio of each color is different.

The modulation signal generator 200 is composed of the image density data memory circuit 210, a read-out circuit 220, a latch circuit 230, an image discrimination circuit 231, an MTF correction circuit 232, a γ correction circuit 233, circuit for determining reference wave phase 240, select circuits 250A to 250C, modulation circuits 260A to 260C, reference clock generator 280, triangular wave generating circuit 290 and delay circuits group 291.

The image density data storing circuit 210 is usually a page memory (which is referred to as a page memory 210, hereinafter). That is, the image density data storing circuit 210 is a RAM which stores the data by the unit of a page, and at least has a capacity of storing a page of multi-value image density data. When the apparatus is used for a color printer, the apparatus must be provided with a storage capacity enough to store the image density signal corresponding to a plurality of colors, for example, yellow, magenta, cyan and black. The read-out circuit 220 reads out continuous image density data of every one scanning line, which is continued in synchronization with the standard clock $DCK_0$, from the image density data memory circuit (page memory) 210, and sends it to the RE processing circuit, the image discrimination circuit 231, and MTF correction circuit 232, wherein an index signal is used as a trigger.

The latch circuit 230 is a circuit which latches the image density data only when the processing in the circuit for determining reference wave phase 240.

The reference clock generator 280 is a pulse generating circuit, and generates a pulse signal with a cycle period identical to that of the pixel clock, and sends it to the read-out circuit 220, triangular wave generating circuit 290, developing circuits group 291 and modulation circuits 260A–260C. This clock is called reference clock $DCK_0$ for convenience' sake.

The numeral 290 represents a triangular wave generation circuit and it forms, based on reference clock $DCK_0$, waveforms for both reference triangular wave $\phi_0'$ which is a reference wave whose cycle is the same as that of a pixel clock and triangular wave $\phi_0''$ which is a reference wave whose cycle is two times that of a pixel clock. Further, in delay circuit group 291, a plurality of clocks $DCK_1'$–$DCK_4'$ and $DCK_1''$–$DCK_4''$ each having a phase difference of a constant period of cycle (⅙ cycles in the present example) against the reference clock $DCK_0$ and the clock whose cycle is two times that of a reference clock are generated, and based upon this, it outputs triangular waves $\phi_1'$–$\phi_4'$ and $\phi_1''$–$\phi_4''$ (in this example, triangular waves $\phi_1'$ and $\phi_4''$ whose cycle is ahead by ⅙ cycles, triangular waves $\phi_2'$ and $\phi_2''$ whose cycle is ahead by ⅔ cycles, triangular waves $\phi_3'$ and $\phi_3''$ whose cycle is behind by ⅙ cycles and triangular waves $\phi_4'$ and $\phi_4''$ whose cycle is behind by ⅔ cycles).

Select circuits 250A–250C have input portion for triangular waves $\phi_1'$–$\phi_4'$ and $\phi_1''$–$\phi_4''$ each being different, in terms of phase, from the aforementioned reference triangular waves $\phi_0'$ and $\phi_0''$, and one of the aforementioned triangular waves is selected by selection signals coming from reference wave phase determination circuit 240 which will be stated later, and is sent to input terminal T of modulation circuit 260A–260C.

As illustrated in FIG. 3, the modulation circuits 260A–260C have the same circuit structure. The modulation circuits are provided with the D/A-conversion circuit 261, the comparator 262, and input portion T for the reference triangular wave $\phi_0'$ and triangular waves having phases each being deviated by ⅙ cycles as well as triangular wave $\phi_0''$ having a double cycle and triangular waves having phases each being deviated by ⅙ cycles. The image density data inputted through latch circuit 230 is D/A-converted by the D/A-conversion circuit 261 synchronously with reference clock $DCK_0$, and the modulated image density data are compared with a reference wave that is the triangular wave inputted from select circuits 250A–250C. Thus, pulse-width-modulated signals are obtained.

Image discrimination circuit 231 selects a reference wave from $\phi_0'$–$\phi_4'$ for a character area and from $\phi_0''$–$\phi_4''$ for a halftone area.

As shown in FIG. 2, the circuit for determining reference wave phase 240 is composed of a one line delay circuit 242, a one clock delay circuit 243, and an arithmetic processing circuit 241. The one line delay circuit 242 operates as follows: the image density data of the first one scanning line of three scanning lines of the image density data in which one scanning line is sent at a time is delayed by two line scanning time periods by the one line delay circuit 242; the image density data of the second one scanning line is delayed by one line scanning time period by the circuit 242; and the image density data of the last one scanning line is not delayed. Further, each image density data is delayed for the time of two reference clocks or one reference clock by the one clock delay circuit 243, and all image density data of the pixels, which include the objective pixel and adjoin the pixel, are sent at the same time to the arithmetic processing circuit 241.

In the arithmetic processing circuit 241, the image density data of the small pixel is obtained by the RE processing.

The image density data of the obtained small pixel is divided into a small scanning line including s1, s2, s3 . . . shown in FIG. 5(b), the small scanning line including s4, s5, s6 . . . , and the small scanning line including s7, s8, s9 . . . , and one scanning line of the original pixel corresponds to these three scanning lines of the small pixels.

Figure 9:
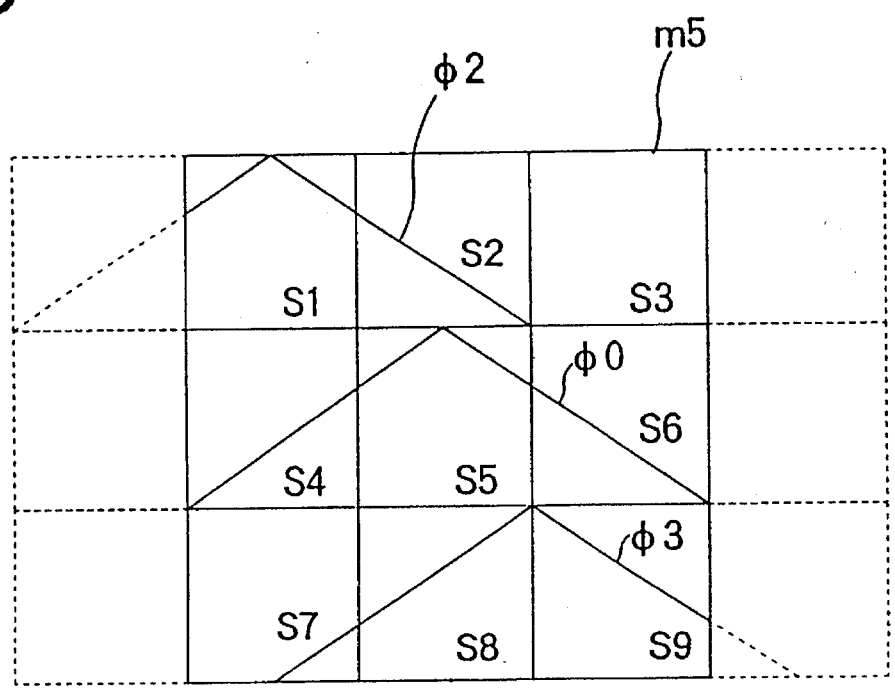
FIG. 9 is a diagram for illustrating the phase displacement for a reference wave in the case of a character area.

The arithmetic processing circuit 241 calculates average density of each small scanning line and the position of gravity center of the density data in each small scanning line, outputs the average density data to emission output of laser drivers 301A to 301C and outputs different selected signals based on the position data of gravity center to select circuits 250A to 250C from the output terminals OA to OC. That is, when the gravity center of density of s1, s2, and s3 of the pixel m5 (the first small scanning line) is positioned in the vicinity of the center of s2, signals selecting reference triangular wave $\phi_0'$ having not displacement of phase are outputted, when the gravity center is positioned in the vicinity of a boundary between s2 and s1, signals selecting triangular wave $\phi_1'$ having a phase advanced by ⅙ cycles are outputted, when the gravity center is in the vicinity of the center of s1, signals selecting triangular wave $\phi_2'$ having a phase advanced by ⅔ cycles are outputted, when the gravity center is in the vicinity of a boundary between s2 and s3, signals selecting triangular wave $\phi_3'$ having a phase delayed by ⅙ cycles are outputted, and when the gravity center is in the vicinity of the center of s3, signals selecting triangular wave $\phi_4'$ having a phase delayed by ⅔ cycles are outputted, all from output terminal OA to select circuit 250A. In the same manner, from the output terminal OB, the position data for selecting triangular wave of gravity center of the second small scanning line which is determined by the position of gravity center of density of s4, s5, and s6 of the pixel m5 is outputted to select circuit 250B, and from the output terminal OC, the position data for selecting triangular wave of gravity center of the third small scanning line which is determined by the position of gravity center of density of s7, s8, and s9 of the pixel m5, is outputted to select circuit 250C. FIG. 9 is an illustration showing an example of the relation between the triangular waves having different phases and the objective pixel.

Figure 17:
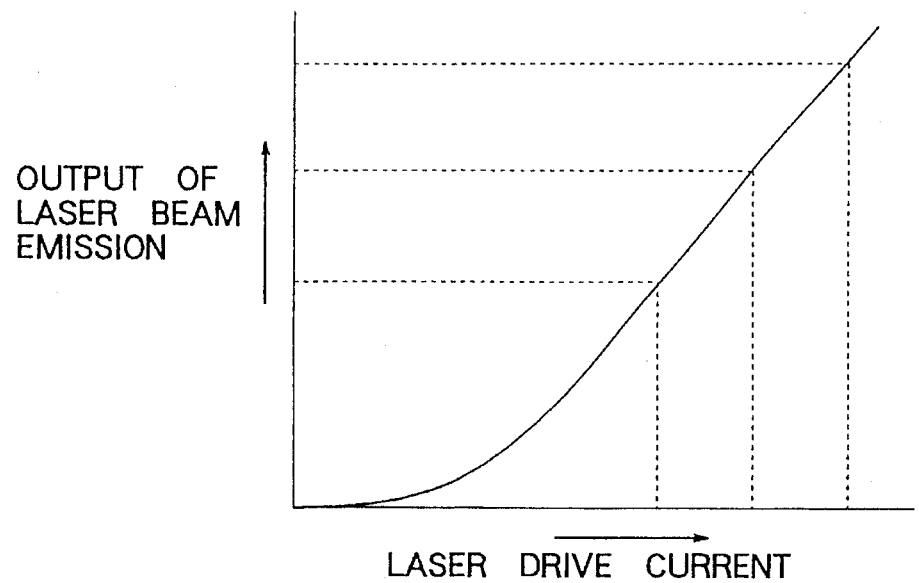
FIG. 17 is a graph showing an example of the relation between driving current for a semiconductor laser and laser radiation output.

The arithmetic processing circuit 241 controls an emission output of laser drivers 301A to 301C corresponding to the average density in the pixel m5 of each small scanning line. For example, the circuit 241 controls a semiconductor laser 301A to emit the beam in proportion to the average density of s1, s2 and s3. FIG. 17 is a graph showing an example of the relation between a driving current of the semiconductor laser and the output of laser emission.

Next, the case where a density distribution in two pixels is found will be explained as follows. The density data of the obtained small pixel is divided into a small scanning line including s1, s2, s3 . . . , the small scanning line including s4, s5, s6, and the small scanning line including s7, s8, and s9, in m5 and m6 in FIG. 5(*a*) and 5(*b*), and three small scanning lines of the small pixels correspond to one scanning line in every two pixels of the original pixel.

Figure 11:
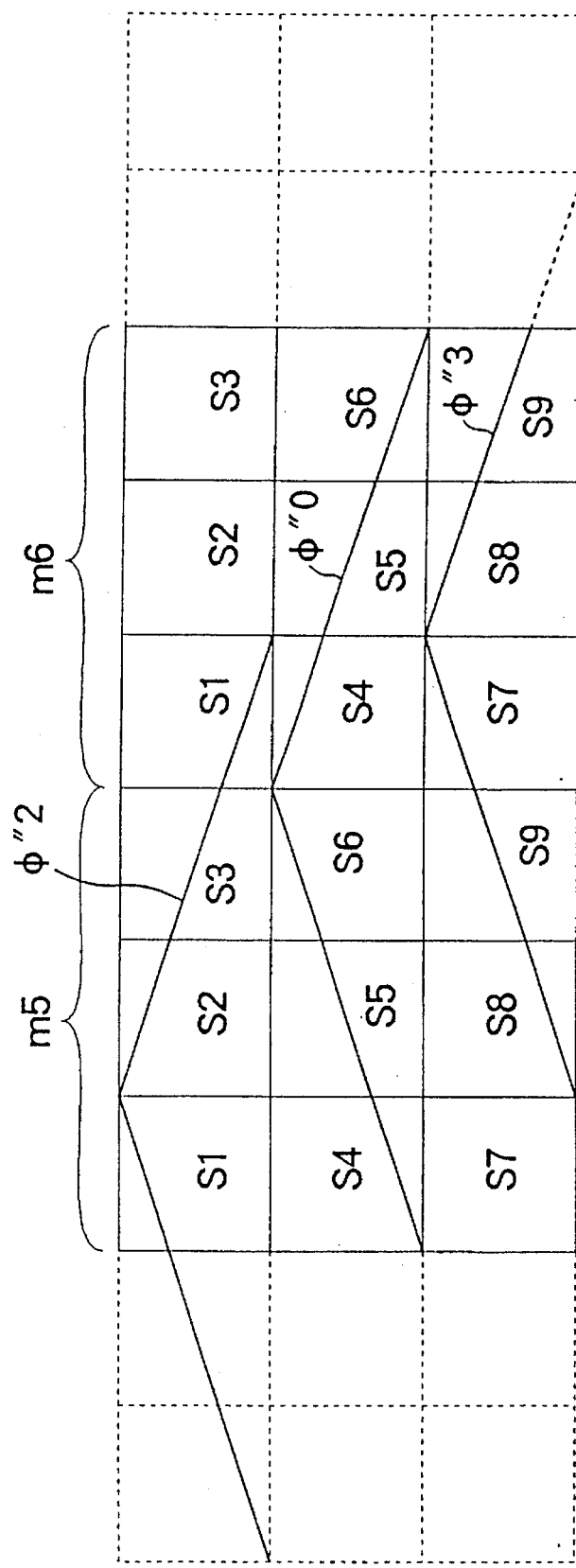
FIG. 11 is a diagram for illustrating the phase displacement for a reference wave in the case of a halftone area.

The arithmetic processing circuit 241 further calculates average density of each small scanning line and a position of gravity center of density data within one original pixel of each scanning line, and outputs the average density data to emission output of laser drivers 301A–301C and outputs each different selection signal based on the data of the gravity position to select circuits 250A–250C from output terminals OA–OC. Namely, when the gravity center of s1, s2 and s3 (first small scanning line) of m6 adjoining pixel m5 is in the vicinity of the center of s3 of m5 and s1 of m6, signals for selecting reference triangular wave $\phi_0''$ having no phase displacement are outputted, when the gravity center is in the vicinity of a boundary between s2 of m6 and s1 of m6, signals for selecting triangular wave $\phi_1''$ having a phase advanced by ⅙ cycles are outputted, when the gravity center is in the vicinity of a boundary between s2 of m6 and s3 of m6, signals for selecting triangular wave $\phi_2''$ having a phase advanced by ⅔ cycles are outputted, when the gravity center is in the vicinity of a boundary between s2 of m5 and s3 of m5, signals for selecting triangular wave $\phi_3''$ having a phase delayed by ⅙ cycles are outputted, and when the gravity center is in the vicinity of a boundary between s1 of m5 and s2 of m5, signals for selecting triangular wave $\phi_4''$ having a phase delayed by ⅔ cycles are outputted, all from output terminal OA to select circuit 250A. In the same manner, from the output terminal OB, the triangular wave selection signals of the second small scanning line which is determined by the position of gravity center of density of s4, s5, and s6 of the pixels m5 and m6 is outputted to the select circuit 250B, and from the output terminal OC, the triangular wave selection signals of the third small scanning line which is determined by the position of gravity center of density of s7, s8, and s9 of the pixels m5 and m6, is outputted to the select circuit 250C. FIG. 11 is an illustration showing an example of the relation between the triangular waves having the aforesaid different phase and the objective pixel mentioned above.

As described above, the arithmetic processing circuit 241 controls emission output of laser drivers 301A to 301C, depending on the average density in pixels m5 and m6 of each small scanning line. For example, the circuit 241 controls the semiconductor laser 301A to emit the laser beam in proportion to the average density of s1, s2, and s3 between each pixel. FIG. 17 is a graph showing an example of the relation between a driving current of a semiconductor laser and an output of the laser emission.

The image discrimination circuit 231 discriminates the image data whether they are the first threshold value or the second one, and when it discriminates to be the area other than the first and second threshold values, selection signals which do not output a triangular wave in which reference wave phase determining circuit 240 has selected all color components but output reference triangular waves $\phi_0'$ and $\phi_0''$ are sent to select circuits 250A–250C, and MTF correction circuit 232 is not caused to operate. Due to the aforementioned, the image density data other than what is read out from the read-out circuit 220 is not corrected by the MTF correction circuit 232, and after it has been corrected by the γ correction circuit 233, it is sent to modulation circuits 260A to 260C through the latch circuit 230.

Due to the aforementioned, in the highlight and high density regions, an image which has high uniformity and no noise can be formed.

The image discrimination circuit 231 further discriminates generally, under the aforementioned conditions, which of the character region and halftone region the image belongs to. The discrimination is conducted by the density change in 16×16 pixels including the objective pixel. When the density change of the region is large, the discrimination circuit discriminates that the objective pixel belongs to the character region, and when the density change of the region is small, the circuit 231 discriminates that the objective pixel belongs to the halftone region. Further, when the result of the discriminated region is different only in a minute region, for example, when the halftone region exists, being isolated, in the character region, the halftone region is discriminated as the character region. In the case of the halftone region, the image is discriminated in the same manner. When the character and line are discriminated to belong to the character region, a reference wave is selected from $\phi_0'-\phi_4''$ which are identical to image cycles, and selection signals which output a triangular wave wherein reference wave phase determining circuit 240 selects all color components to modulation circuits 260A–260C are outputted to select circuits 250A–250C, and image density data are sent, without being processed, to modulation circuits 260A–260C through latch circuit 230, with MTF correction circuit 232 and γ correction circuit 233 both being caused to be suspended. Due to the aforementioned, a sharp character or edge portion whose color is not changed, can be reproduced. Further, when the circuit 231 discriminates that the image belongs to the halftone region, the reference wave is selected from $\phi_0'-\phi_4''$ which are twice that of an image.

Due to the aforementioned processing, a high gradation image can be formed in the halftone region, and also an effect by which a character image is given sharpness and neatness.

An image data in which a specific color, for example, is converted into the density data of R+2G+B, (in this case, R is a density data of red, G is that of green, and B is that of blue), is used for determination of the phase of the reference wave. For convenience sake, the density data of (R+2G+B) will be expressed by N, hereinafter.

When the phase of the reference wave is used in common with respect to each recording color, gradation of an image can be assured, and color change can be prevented. For determination of the phase of the reference wave, a G component which visually coincides with the image density data, or achromatic data having the G component is preferably used.

For the same reason, the data which is used for the image discrimination circuit 231 is data which is common with each color.

The modulation circuits 260A to 260C operate in the following manner: the signal of the image density data inputted through the latch circuit 230 by the triangular wave in which is the selected reference wave is modulated; after that, the modulation signal which is pulse width modulated by the circuit, is generated; and the circuit sends out the modulation signal to the raster scanning circuit 300 after three small scanning lines (one scanning line in the case of the original image density data) in which these modulated signals are continued in parallel, are made to be one unit.

Next, operation of the modulation signal generator 200 will be explained as follows.

Figure 10:
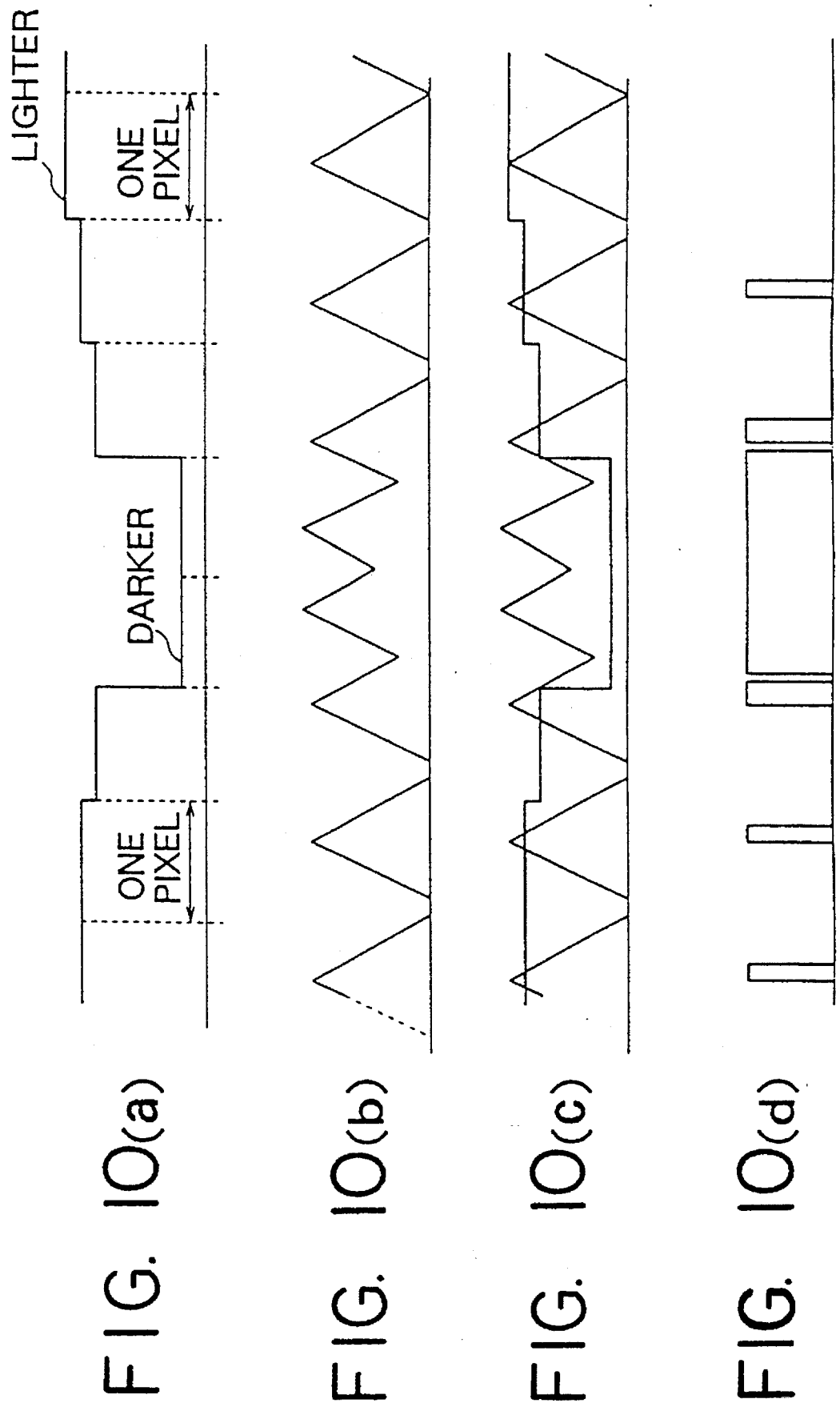
FIGS. 10(a)–10(d) are timing charts showing each signal in the case of a character area for a modulation signal generation circuit in the example shown in FIG. 1.

FIGS. 10(*a*) to (*d*) are time charts showing a signal in each position of the modulation signal generator in the case where the signal is recording-position-modulated in the region which is discriminated as the character region. A period of the reference wave is the same as that of the original pixel.

In FIG. 10, (*a*) shows a portion of the signal in which the image density data read out according to the standard clock $DCK_0$ from the page memory 210 making the index signal a trigger, is converted into an analog value by the D/A converter 261. The higher the level is, the lower is the density shown, and the lower the level is, the darker is the density shown.

FIG. 10(*b*) shows the triangular wave which is the reference wave that is outputted successively from the select circuit 250 and includes delayed one.

FIG. 10(*c*) shows the triangular wave (solid line), and the image density signal (one dot chain line) which is converted into the analog value, and shows the modulation operations in the modulation circuits 260A to 260C.

FIG. 10(*d*) shows the pulse width modulation signal which is generated after the signal has been compared by the comparator 262.

Due to the result of generation of the modulation signal, the recording position modulation is not conducted in the case of the pixel in the low density portion, or the high density portion, and in an region in which density change is large, the recording position modulation by which the position of small dots of n lines in the objective pixel is moved to the position along the original character and the line direction of the line image, is conducted according to the density data of the original adjoining pixel, so that the character and the line image can be reproduced sharply.

Figure 12:
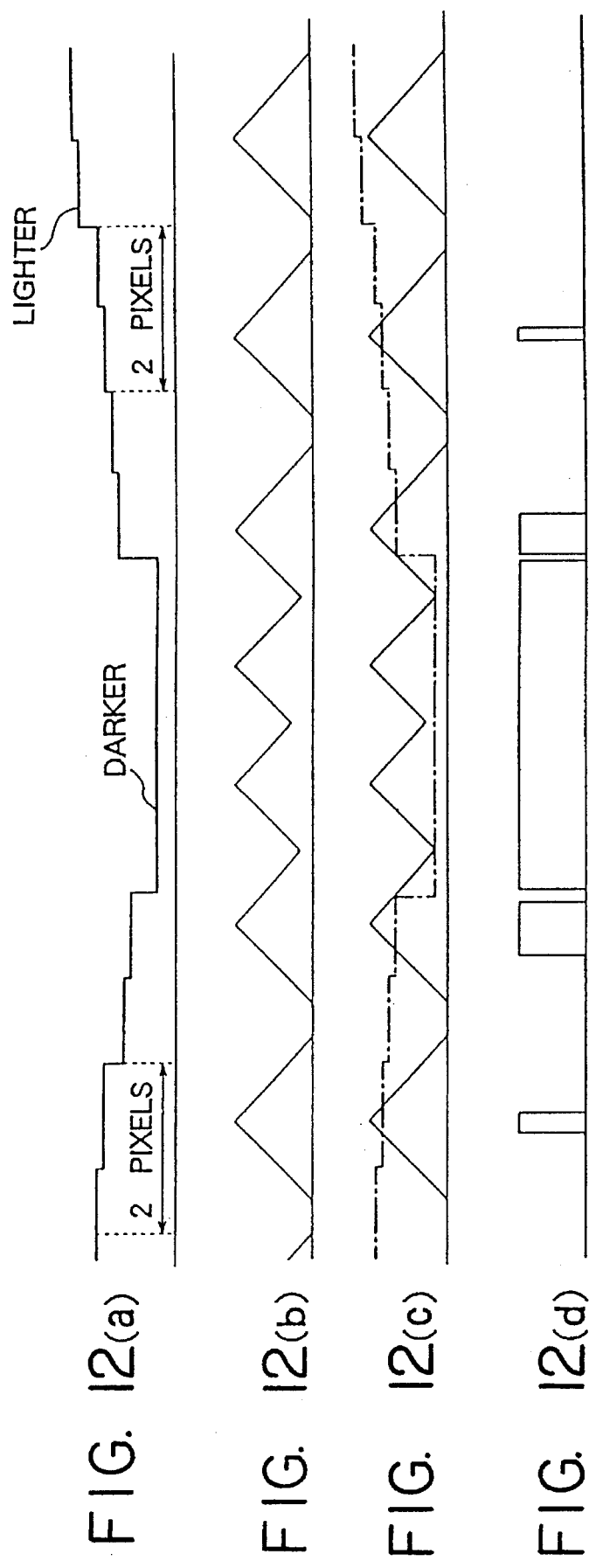
FIGS. 12(a)–12(d) are timing charts showing each signal in the case of a halftone area for a modulation signal generation circuit in the example shown in FIG. 1.

FIGS. 12(*a*) to (*d*) are time charts showing the signal of each portion in the modulation signal generator in the case where the signal is recording-position-modulated in the region which is discriminated as the halftone region. As shown in FIG. 11, the period of the reference wave is twice the period of the recording pixel.

In FIG. 12(*a*)–(*d*), (*a*) shows a portion of the signal in which the image density data read out from the page memory 210 according to the standard clock $DCK_0$ by making the index signal a trigger, is converted into an analog value by the D/A converter 261. The higher the level is, the lower is the density shown, and the lower the level is, the darker is the density shown. The image data has the image density in which data of two pixels are averaged in the primary scanning direction.

FIG. 12(*b*) shows the triangular wave which is the reference wave outputted successively from the select circuit 250 and includes delayed one.

FIG. 12(*c*) shows the triangular wave (solid line), and the image density signal (one dot chain line) which is converted into the analog value, and shows the modulation operations in the modulation circuits 260A to 260C.

FIG. 12(*d*) shows the pulse width modulation signal which is generated after the signal has been compared by the comparator 262.

Due to the result of generation of the modulation signal, the recording position modulation is not conducted in the case of the pixel positioned in the low density portion, or the high density portion, and in a region in which density change is large, the recording position modulation by which the position of small dots of n lines in the objective pixel is moved to the position along the direction in which the density change is large, is conducted according to the density data of the original adjoining pixel, so that even halftones in photography or the like can be reproduced sharply.

Further, when a phase of the reference wave is shifted in the subsidiary scanning direction successively, a dot corresponding to a halftone dot having a screen angle can be structured. For example, when the screen angle is 45° for a yellow component, 26.6° for a magenta component, −26,6° for a cyan component, and 0° for a black component, uniformity of the color reproduction can be improved, and generation of moire fringe pattern can be eliminated.

In particular, it is a merit in this invention that when the screen angle for the black component is 0°, the recording position modulation means can be used without any alteration.

The raster scanning circuit 300 is provided with a δ delay circuit 311, a 2δ delay circuit 312, laser drivers 301A to 301C, an index detection circuit which is not shown in the drawings, and a polygonal mirror driver, and the like.

Laser drivers 301A to 301C oscillate a semiconductor laser array 431 having a plurality of (in this case, three) laser emission sections 431A to 431C by the modulation signal from the modulation circuits 260A to 260C, and a signal corresponding to an amount of light beams from the semiconductor laser array 431, is fed back, and the laser drivers 301A to 301C drive the semiconductor laser array 431 so that the light amount can be kept constant.

The index detection circuit detects the surface position of the rotating polygonal mirror 434 which is rotated at a predetermined speed by an index signal outputted from an index sensor 439 shown in FIG. 4, and conducts optical scanning by the image density signal modulated by the raster scanning method according to the period of the primary scanning direction. The scanning frequency is 2204.72 Hz, the effective printing width is not less than 297 mm, and the effective exposing width is not less than 306 mm.

The polygonal mirror driver rotates a D.C motor at a predetermined speed uniformly, and a rotary polygonal mirror 434 at 16535.4 rpm.

Figure 15:
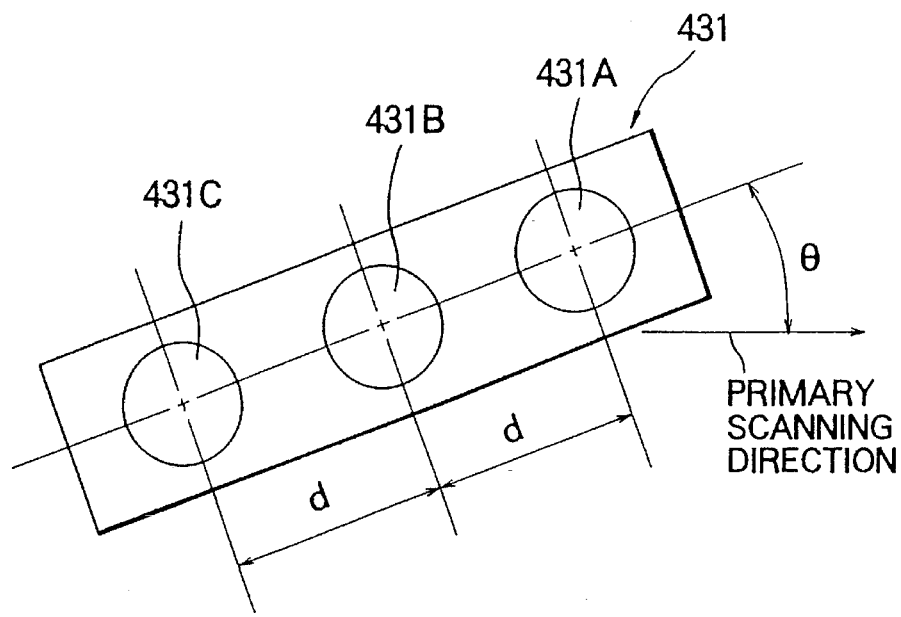
FIG. 15 is a diagram showing a semiconductor laser alley in the example shown in FIG. 4.
Figure 16:
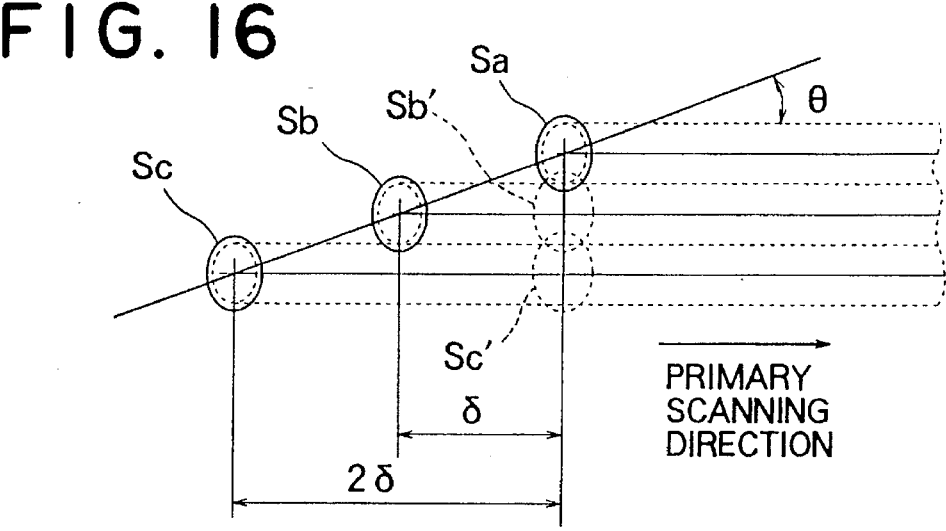
FIG. 16 is a diagram showing a scanning locus of a laser spot by means of a semiconductor laser alley shown in FIG. 13.

As shown in FIG. 15, the semiconductor laser array 431 is used in the manner that three emitting portions 431A to 431C are positioned in the array at same intervals. Since it is normally difficult that a space d between emitting portions is not more than 20 μm, a shaft which passes through the center of emitting portions 431A to 431C is mounted to be parallel with the rotating shaft of the rotary polygonal mirror 434, and to be inclined at a predetermined angle with respect to the primary scanning direction as shown in FIG. 15. Due to the aforementioned, laser spots sa, sb, sc of the laser beam by the semiconductor laser array 431 on the photoreceptor 401 can scan upwardly and downwardly in the manner that they are close to each other, as shown in FIG. 16. However, due to the aforementioned, positions of laser spots sa, sb, and sc in the scanning direction are deviated respectively with respect to the primary scanning direction. In order to correct the deviation, when the δ delay circuit 311 is inserted between the modulation circuit 260B and the laser driver 301B, and the 2δ delay circuit 312 is inserted between the modulation circuit 260C and the laser driver 301C so that an appropriate amount of time is delayed and the timing is adjusted, laser spots sa, sb, and sc emitted from the semiconductor laser array 431 are replaced by sa, sb' and sc' which are vertically arranged with respect to the primary scanning direction so that sa, sb' and sc' can be recorded.

When the RE processing is conducted in the manner that the objective pixel is divided into 2×2 small pixels, the semiconductor laser array having two emitting portions is used.

Figure 20:
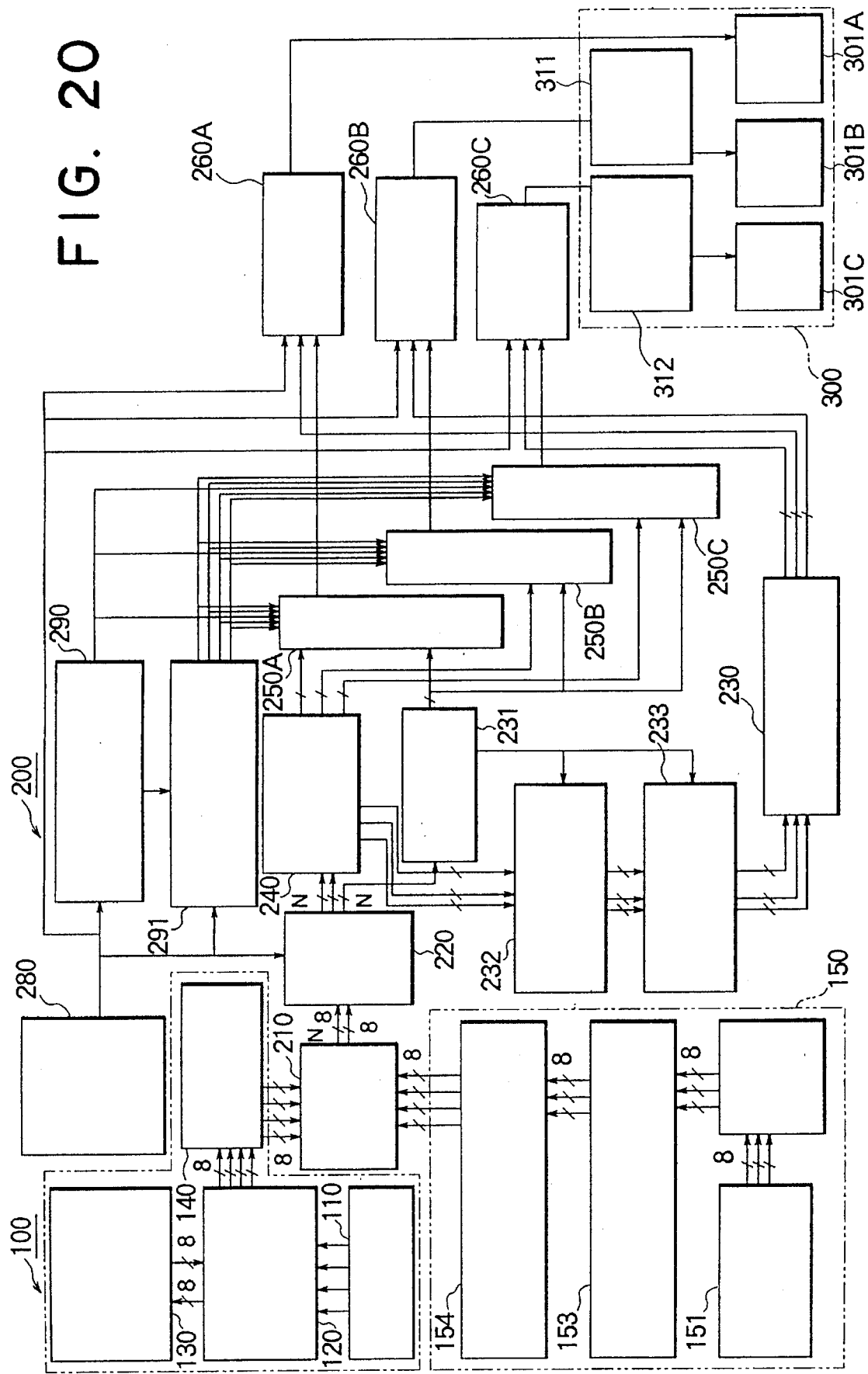
FIG. 20 is a block diagram showing an image processing circuit in the second example of the invention.
Figure 21:
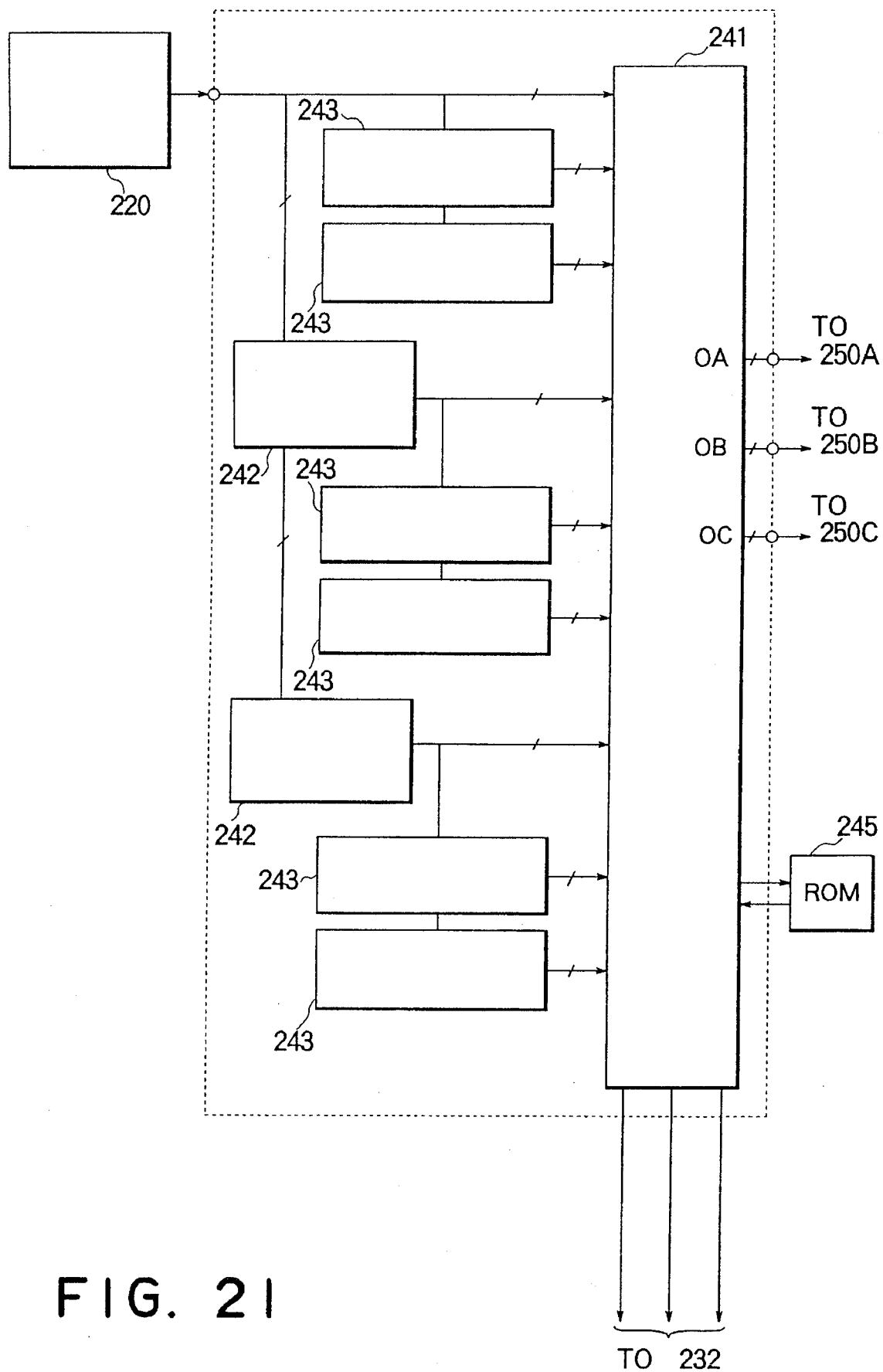
FIG. 21 is a block diagram showing a phase determination circuit for a reference wave in FIG. 20.

In the aforementioned embodiments of the present invention, as for the density information in each scanning direction, the average density in the primary scanning direction is regarded as the laser emitting output, and the data outputted from the read-out circuit 220 is used for the image data. However, the following structure can be adopted in which: the average density of each small scanning line obtained by reference wave phase determining circuit 240, as shown in FIG. 20 and FIG. 21, is used for the density information; and the density data is inputted into the modulation circuits 260A to 260C by each reference wave so that laser drivers 301A to 301C are modulated.

Next, the image forming process of the image forming apparatus 400 shown in FIG. 4, will be explained as follows.

First, the photoreceptor 401 is uniformly charged by the scorotron charger 402. An electrostatic latent image corresponding to yellow is formed on the drum-shaped photoreceptor 401 by the laser beam which has been modulated by yellow data (8 bits of digital density data) stored in the image density data storing circuit 210 through cylindrical lens 433, rotary polygon mirror 434, fθ lens 435, cylindrical lens 436 and reflection mirror 437. The aforementioned electrostatic latent image corresponding to yellow is developed by the first developing unit 441, and the first dot-shaped toner image (a yellow toner image), which is very sharp, is formed on the photoreceptor 401. The first toner image passes under the retreated cleaning unit 470 without being transferred onto recording paper, and the photoreceptor 401 is charged by the scorotron charger 402 again.

Next, the photoreceptor 401 is irradiated by the laser beam modulated by magenta data (8 bits of digital density data) and an electrostatic latent image is formed. This electrostatic latent image is developed by the second developing unit 442 so that the second toner image (a magenta toner image) is formed. In the same way, the third toner image (a cyan toner image) is sequentially developed by the third developing unit 443, and a three-color toner image is formed on the photoreceptor 401. Finally, the fourth toner image (a black toner image) is formed, and a four-color toner image is formed on the photoreceptor 401.

According to the image forming apparatus 400 of this embodiment, the photoreceptor has an excellent high γ characteristic. According to the aforementioned excellent high γ characteristic, even when a plurality of toner images are formed on the photoreceptor by conducting a plurality of charging and developing processes, a latent image can be stably formed. That is, even when a toner image is illuminated with a beam according to a digital signal, a very sharp dot-shaped electrostatic latent image without a fringe is formed. As a result, a very sharp toner image can be obtained.

These four images each having a different color are transferred, through operation of transfer unit 462, onto a recording sheet fed from a sheet feeding unit.

Recording paper on which the toner image has been transferred, is separated from the photoreceptor 401 by the separation electrode 463. Then, recording paper P is conveyed by a guide and conveyance belt to the fixing roller 464 so that the transferred image is fixed. After that, recording paper P is discharged onto a discharge tray.

In the present embodiment, as the result of experimenting in which values of factor P for RE processing were changed variously, a fine image could be obtained in the range of 0.1 to 0.9 of P. However, since sharpness of characters is insufficient when P is small, and an edge portion of a line image or a dot image is too emphasized when P is large, it was found that the preferable range of P is 0.3 to 0.7. Due to this, when an original document was written by line images or dots, the edge portion could be formed clearly, so that, even in the case of small characters, detail could be reproduced. Further, bad effects did not occur in the low density portion or high density portion. This is due to the reason that this method stops the recording position modulation with respect to these pixels, and makes the factor P=0.

Although, in this method, P can be used as a constant, it is preferable that P is changed in synchronization with the recording period, that is, corresponding to the image (in a character region or halftone region). When the P value is defined as $P_1$ in the case where the recording period is short, that is, the image is in the character region, and the P value is defined as $P_2$ in the case where the recording period is long, that is, the image is in the halftone region, the relation $$P_1 > P_2$$

is preferable. That is, when the image exists in the character region, the P value is set large, preferably 0.9 to 0.4, and when the image exists in the halftone region, the P value is set small, preferably 0.6 to 0.1.

P=0 corresponds to the value in the case where recording position modulation is not conducted.

Further, in the present invention, the ratio of the RE processing can be changed.

Figure 18:
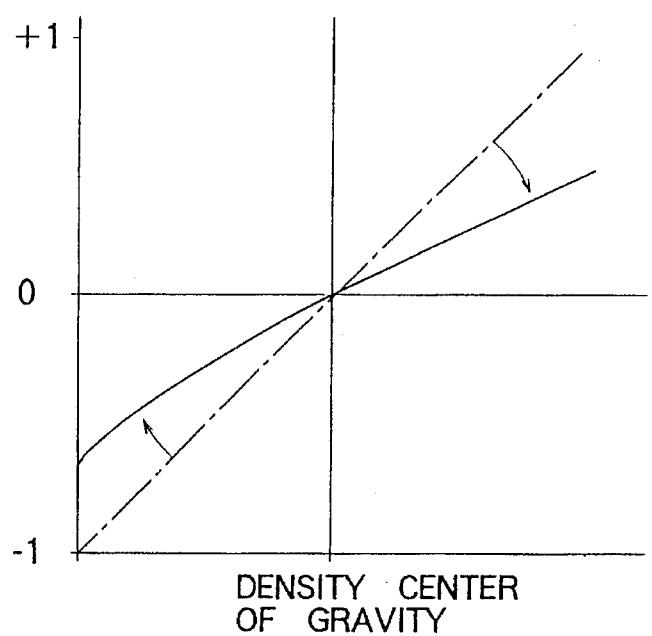
FIG. 18 is a graph showing an example of an occasion wherein the relation between a center of gravity in the primary scanning direction of a small scanning line and a recording position is changed.

FIG. 18 is a graph showing an example of the case where the relation between the recording position in the primary scanning direction and the gravity center is converted.

Figure 19:
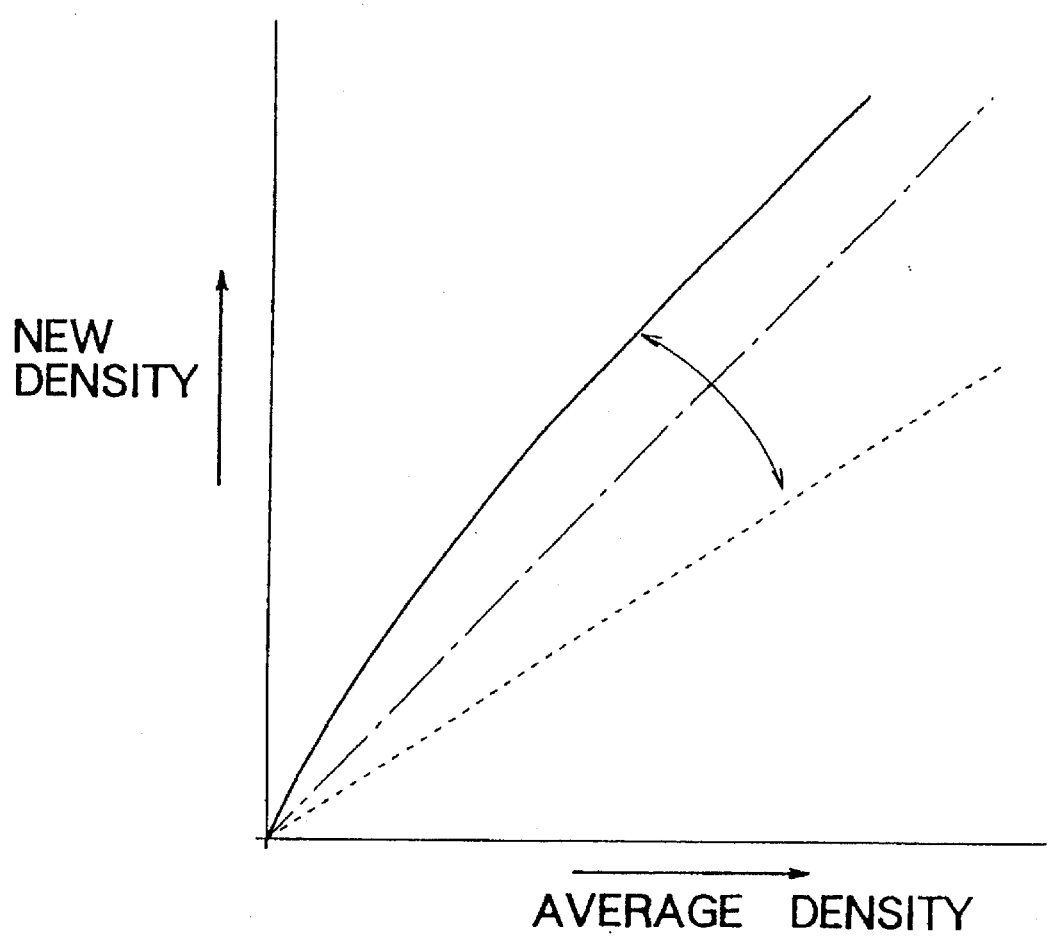
FIG. 19 is a graph showing an example of an occasion wherein average density in the secondary scanning direction of a small scanning line is converted.

The recording position can be changed according to a conversion equation which is set beforehand, for example, as shown in FIG. 18 using a ROM 245 in which the result obtained from the image density data by arithmetic processing is contained. In the same way, the average density in secondary scanning direction can also be converted as shown in FIG. 19.

It is preferable to change the ratio of conversion shown in FIG. 33, and FIG. 34 corresponding to the case where the period of the reference wave is changed. When the period of the reference wave is large, it is preferable that gradation is seriously considered, and the ratio of the recording position modulation is decreased, or γ of gradation is decreased.

In the aforementioned flow of the image data, an example of a laser printer which outputs the data having been stored once in the page memory 210 is explained. However, the present invention is not limited to the specific embodiments, but when the image data processing circuit 100 is replaced by the image data processing circuit 150 composed of the color scanner 151, the A/D converter 152, the density converter 153, the masking UCR circuit 154 and the like, and the image density data is inputted into the processing circuit 150 from the scanner and the image is processed in the circuit, the present invention can be adopted to other image forming apparatus such as a copying apparatus and the like.

Further, although the period of the reference wave is changed at each pixel corresponding to the result of image discrimination, the entire image frame can be changed uniformly by an external command such as a character, photographic mode and the like.

This method is adopted to a device, like a light emitting panel EL, in which the pulse width can be modulated in the subsidiary scanning direction.

As described above, an excellent recorded image was obtained in the following method: corresponding to density data of an objective pixel, a phase of the reference wave signal is selected from image data subjected to RE processing wherein, for an objective pixel located in a specific density range, the objective pixel is divided into small pixels and with regard to the density of the small pixel, the density of the objective pixel is distributed in accordance with distribution of density data of adjoining pixels including the objective pixel, recording position modulation signals obtained by modulating the density signals of the objective pixel with the reference wave are generated, and recording position modulation is not conducted for the low density area and high density area. Further, the image discrimination is conducted by the image discrimination circuit; when the image exists in the character region, the recording position modulation is conducted by the reference wave of a short period; and when the image exists in the halftone region, the recording position modulation is conducted by the reference wave of a long period, thus, an excellent color image forming apparatus, in which sharpness can be increased without causing change in color tone of the color image which is generated from the scanner, CG, or font data, can be provided.

The aforementioned method shows the case where the number of recording beams for the pixel is three. Further, the following methods can be conducted: the pixel can be scanned by one or two recording beams; the recording position modulation can be conducted only in the primary scanning direction, When a high γ photoreceptor is used for the color image forming apparatus, effects can be further improved.

Another example of an image forming apparatus that is one example of the invention will be explained as follows. FIG. 4 mentioned above represents a perspective view showing a schematic constitution of the image forming apparatus in the present example.

In image forming apparatus 400, an area of a dot is changed by pulse width modulation stated above for indication of gradation. With regard to image signals prepared by a computer as described above or read by a scanner, when an edge portion of high image density interferes with a reading pixel, the signals on the relevant pixel become the same as medium density of a uniform image. Further, in the case of the conventional pulse width modulation, a recording dot is formed isolatedly at the center of a pixel for both recording at edge portions and recording at a halftone area. Therefore, only expression with rough resolution has been all done by the pulse modulation system.

In the image forming apparatus of the invention, recording position modulation that displaces, in the primary scanning direction, the position of an electrostatic latent image by means of a recording dot is conducted and formation of a fine dot by means of a plurality of laser beam scanning operations for one pixel is conducted for obtaining an image with improved resolution.

Scanning optical system 430 converts, by means of collimator lens 432, a laser beam emitted from semiconductor laser alley 431 into a plurality of parallel laser beams as parallel beams. The laser beam is subjected to deflection through reflection by means of rotary polygon mirror 434 that rotates at a constant speed and then advances, through fθ lens 435 and cylindrical lenses 433 and 436, to the surface of photoreceptor 401 charged uniformly where the laser beam is focused in a spot shape to become a plurality of laser spots through scanning for imagewise exposure. In this case, the fθ lens 435 is a correcting lens for achieving beam scanning at a constant speed and the cylindrical lenses 433 and 436 are correcting lenses for correcting fluctuations of a spot position caused by accidental inclination of the surface of the rotary polygon mirror 434.

Image forming in the invention will be explained as follows. In the third example, one of reference waves to be combined with image density data is one having a phase difference and the other is a group of a plurality of reference waves each having a different DC component, and image forming is conducted by modulated image signals obtained by combining selectively the image density data and a specific reference wave selected from reference waves. A high γ photoreceptor is especially effective for forming a latent image by responding accurately to the above-mentioned modulated image signals.

Figure 22:
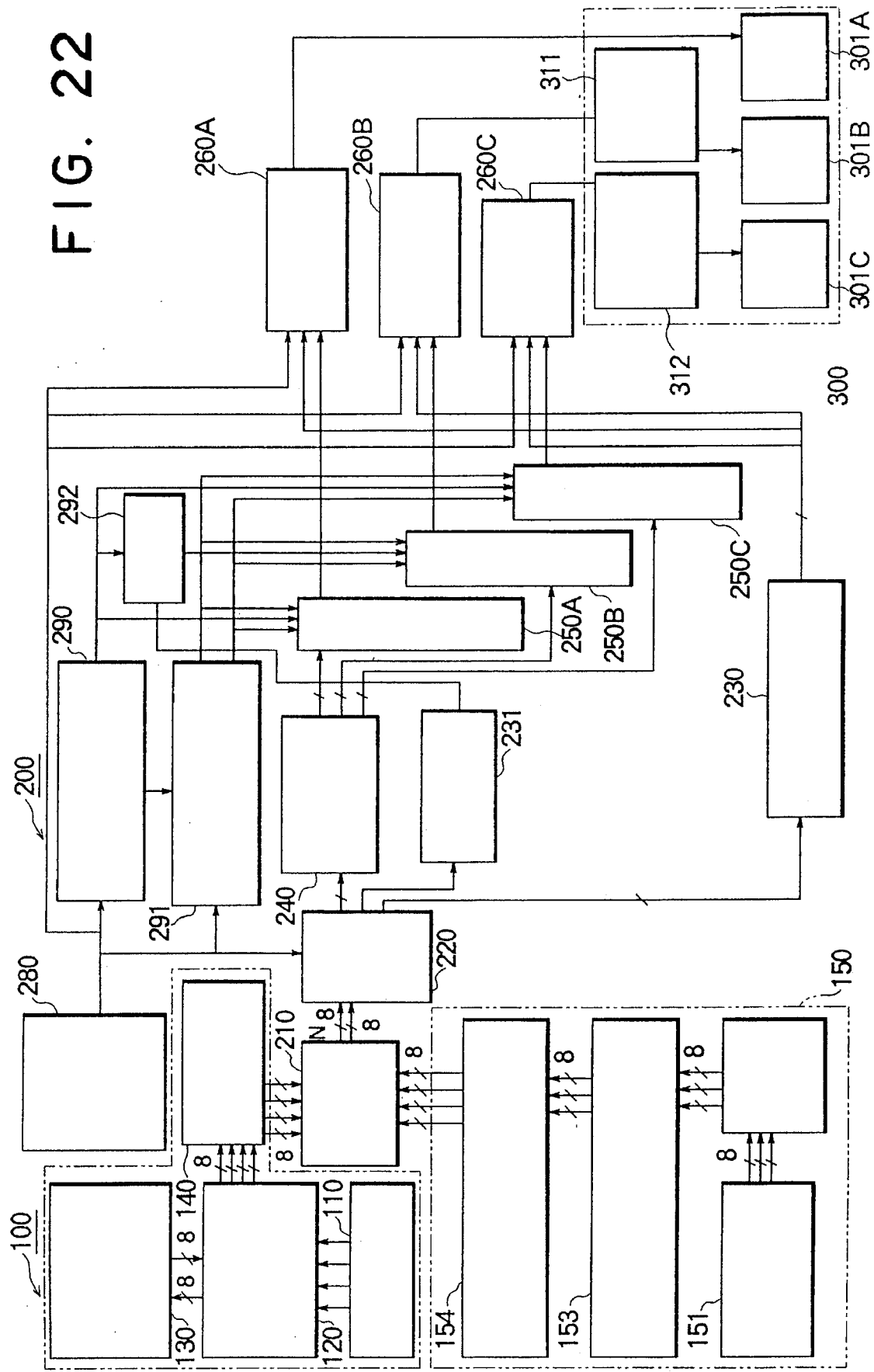
FIG. 22 is a block diagram showing a modulation signal generation circuit in the third example.

FIG. 22 is a block diagram showing an example of an image processing circuit used in the image forming apparatus in the third example of the invention, and FIG. 3 is a block diagram showing a modulating circuit in the present example.

In modulated signal generating circuit 200 in the present example, image density data for a unit of one scanning line are read from image density data storage circuit 210, and from the continuous density data for the unit of one scanning line, image density data corresponding to an edge portion are detected by edge detection circuit 240, and there are generated modulated signals wherein a pulse width is modulated by modulation circuits 260A–260C employing a reference wave having a phase difference in the direction of the edge, in the case of a character reproduction area including characters and line images. In the case of a halftone reproduction area, on the other hand, modulated signals are generated by the modulation circuits 260A–260C employing a reference wave having different DC components and modulating a laser beam that scans the central portion of a pixel. These modulated signals are sent to raster scanning circuit 300 having a driving means for semiconductor laser array 431 that has three emitters.

The modulated signal generating circuit 200 is composed of image density data storage circuit 210, reading circuit 220, latch circuit 230, edge detection circuit 240, image discrimination circuit 241, select circuits 250A–250C, modulating circuits 260A–260C, reference clock generating circuit 280, triangular wave generating circuit 290, delay circuits group 291 and DC component addition circuit 292.

The reading circuit 220 reads, with index signals as a trigger, continuous image density data for a unit of one scanning line from the image density data storage circuit (page memory) 210, synchronizing with reference clock $DCK_0$, and sends them to the edge detection circuit 240 and latch circuit 230.

The latch circuit 230 is a circuit that latches image density data only when the edge detection circuit 240 and the select circuits 250A–250C are processing.

The triangular wave generating circuit 290 conducts wave-forming for a reference triangular wave having the same cycle as that of a pixel clock based on the reference clock $DCK_0$. The delay circuits group 291 represents a circuit that generates a plurality of triangular waves each having a phase difference of 1/n cycles against a reference triangular wave. In the delay circuits group 291, a triangular wave having a phase delayed by ⅓ cycles against the reference clock $DCK_0$ is generated from terminal $\phi_1$, and a triangular wave having a phase delayed by ⅔ cycles, namely advanced by ⅓ cycles, against the reference triangular wave is generated from terminal $\phi_2$.

The edge detection circuit 240 finds a difference value by differentiating successively image density data of a unit of one scanning line inputted continuously, reads from a built-in memory the selected signals corresponding to the difference value, and sends them to select circuits 250A–250C. When the specific value of a differentiated value is assumed to be α, the aforementioned difference value means "+1" when the differentiated value is not less than α, and it means "−1" when the differentiated value is not more than −α. A positive or negative sign for the difference value represents the direction of an edge, and the positive sign means that the edge is located at the left side in the scanning line direction, while the negative sign means that the edge is at the right side in the scanning line direction. For image data other than an edge, namely for the differentiated value ranging between −α and +α, the difference value is assumed to be "0".

The image discrimination circuit 241 is a circuit which judges whether continuous image density data read from reading circuit 220 belongs to a character reproduction area or to a halftone reproduction area. When discrimination is for the character reproduction area, signals for causing DC components added to a reference triangular wave to be zero are sent to DC component adding circuit 292, while when discrimination is for the halftone reproduction area, signals for adding predetermined DC components to a reference triangular wave are sent to the DC component adding circuit 292.

Incidentally, image discrimination may be conducted based on an extent of a change in density of an objective pixel and its surroundings and on existence of an edge. When the objective pixel is lower than specific density (for example, not more than 0.2 in terms of recorded density), discrimination is made for the halftone because it tends to be a noisy image noise through modulation of a scanning position.

The select circuits 250A–250C output triangular waves each having a phase different in accordance with selected signals from edge detection circuit 240 to modulation circuits 260A–260C. To be concrete, when the selected signals are "0", a reference triangular wave is sent, when the selected signals are "+1", a triangular wave delayed be ⅓ cycles is sent, when the selected signals are "−1", a triangular wave advanced by ⅓ cycles are sent, all to terminal T of the modulation circuits 260A–260C. In the case of a halftone reproduction area, therefore, a triangular wave to which predetermined DC components have been added is sent from the select circuit 250B to modulation circuit 260B.

The modulation circuits 260A–260C have the same circuit constitution as shown in FIG. 3 mentioned above, and each of them is composed of a D/A converter 261 and comparator 262. Image density data sent through latch circuit 230 are subjected to D/A conversion made by D/A converting circuit 261 in the modulation circuits 260A–260C synchronizing with reference clock $DCK_0$, and they are compared with a reference wave of a triangular wave inputted from terminal T, thus pulse-width-modulated signals are obtained in the modulation circuits 260A–260C.

Next, operations of the modulated signal generating circuit 200 in the case of a character reproduction area will be explained.

FIGS. 23(a)–(h) represent time charts each showing a signal at each portion in the modulated signal generating circuit in the present example.

In FIG. 23, (a) shows a part of image density data for one scanning line read from page memory 210 with index signals as a trigger based on reference clock $DCK_0$ which have been converted into analog values by D/A converting circuit 261. The digital image density data for one scanning line are sent from the reading circuit 220 to edge detection circuit 240, image discrimination circuit 231 and latch circuit 230 simultaneously. With regard to the image density data, the higher level side it is located, the lower the density is, while the lower level side it is located, the higher the density is.

In FIG. 23, (b) shows the state of edge detection in the primary scanning direction in edge detection circuit 240, and it indicates a differentiated value in the primary scanning direction. As described above, when an absolute value of a differentiated value exceeds the specific value α, discrimination is made for an edge area, and the direction of the edge is judged depending on whether the sign of the value is positive or negative. The outputted value of "0" means that image density data on the same level are existing continuously. This output signal is sent to select circuits 250A–250C based on reference clock $DCK_0$.

The latch circuit 230 latches only for the period necessary for the edge detection circuit 240 and select circuits 250A–250C to process, and sends to the modulation circuits 260A–260C. The select circuits 250A–250C send triangular waves having different phases as mentioned above from an output terminal to the modulation circuits 260A–260C based on selected signals from the edge detection circuit 240.

Figure 23A:
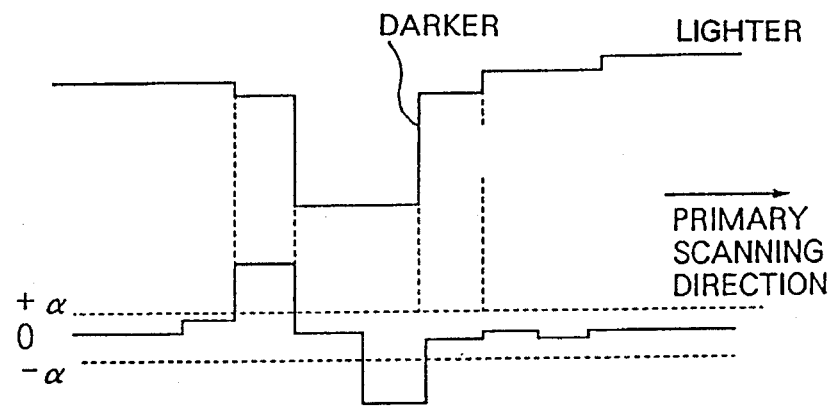
Figure 23C:
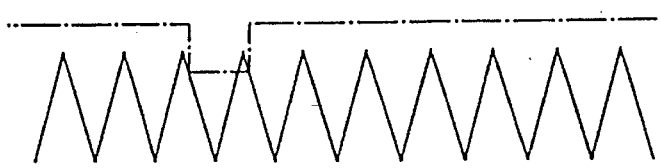
Figure 23D:
Figure 23E:
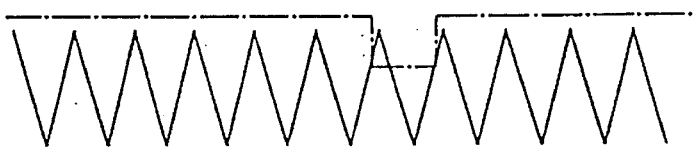

Combinations of reference waves and image density data both to be selected are shown in FIG. 23(c)–(e).

Figure 23F:

A reference wave on the occasion that the value outputted from edge detection circuit 240 in the modulation circuits 260A–260C is plus is shown in FIG. 23(c). In this case, the reference wave is a triangular wave whose phase is delayed from that of the reference triangular wave by ⅓ cycles. Thereby, the phase of the obtained modulated signals which are the output signals from modulation circuits 260A–260C is delayed by ⅓ cycles as shown in FIG. 23(f), which is different from an occasion wherein pulse-width modulation is made with a reference triangular wave. The modulated signals shown with dotted lines are output signals obtained by modulating with a triangular wave having no delayed phase.

Figure 23G:

FIG. 23 (d) shows modulation operations in the case where an output value from edge detection circuit 240 in the modulation circuits 260A–260C is "0", and modulated signals with a reference phase as shown in FIG. 23(g) wherein image density data corresponding to the period when selected signals from the edge detection circuit 240 are "0" are modulated by a reference triangular wave are outputted to the modulation circuits 260A–260C.

Figure 23H:
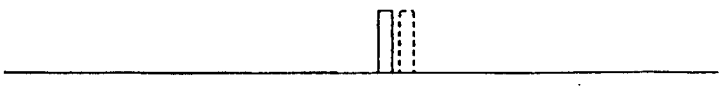

FIG. 23(e) shows modulation operations in the case where an output value from edge detection circuit 240 in the modulation circuits 260A–260C is minus, and image density data corresponding to the period when selected signals from the edge detection circuit 240 show the negative value are inputted, and a reference wave is represented by a triangular wave whose phase is advanced by ⅓ cycles. Due to this, comparator 262 compares, and modulated signals with pulse-width modulation whose phase is advanced by ⅓ cycles as shown in FIG. 23(h) are outputted.

Owing to the edge detection circuit 240 that detects the edge and its direction from image density data as described above, the modulated signal generating circuit 200 in the present example outputs modulated signals for a unit of one scanning line wherein a position of an edge portion has been modulated in the primary scanning direction directly to laser drivers 301A–301C or through δ-delay circuit 311 or 2δ-delay circuit 312, and thereby causes semiconductor laser array 431 to oscillate.

Figure 24:
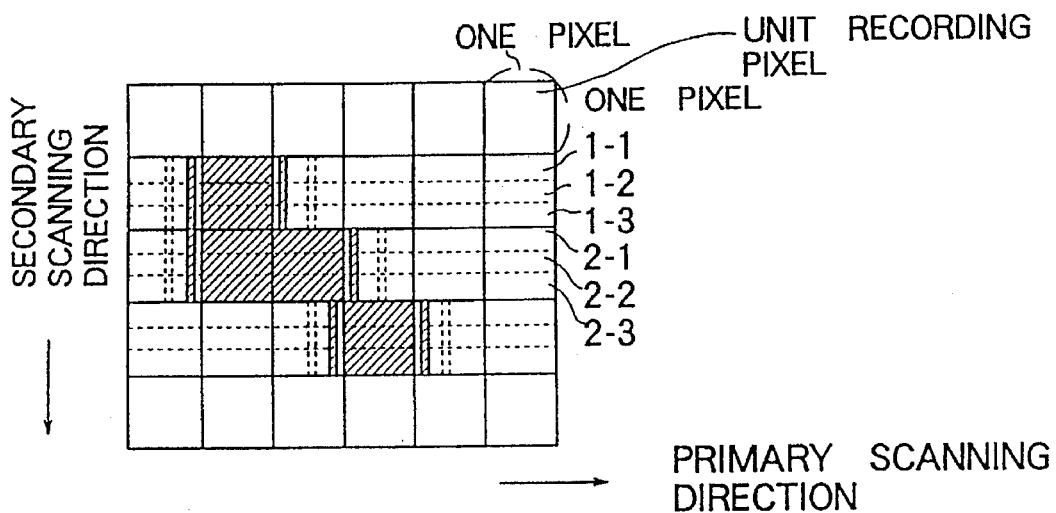
FIG. 24 is an illustrative diagram wherein a latent image in a character reproduction area is formed by modulation signals in the third example.

FIG. 24 is an illustrated diagram showing how a latent image in a character reproduction area is formed with modulated signals from the modulated signal generating circuit 200. As shown in FIG. 24, a dot of an edge portion is deviated toward an edge in the primary scanning direction to be recorded. In the figure, 1-1 shows a line of the aforementioned latent image formed by laser spot sa, 1-2 shows a line of the latent image formed by laser spot sb, and 1-3 shows a line of the latent image formed by laser spot sc. Nest scanning lines are represented by 2-1, 2-2 and 2-3. When forming an electrostatic latent image whose recording position is modulated, it is possible to improve resolution on an edge portion. What is shown with dotted lines in FIG. 24 represents a record made by a conventional image forming apparatus.

Figure 25:
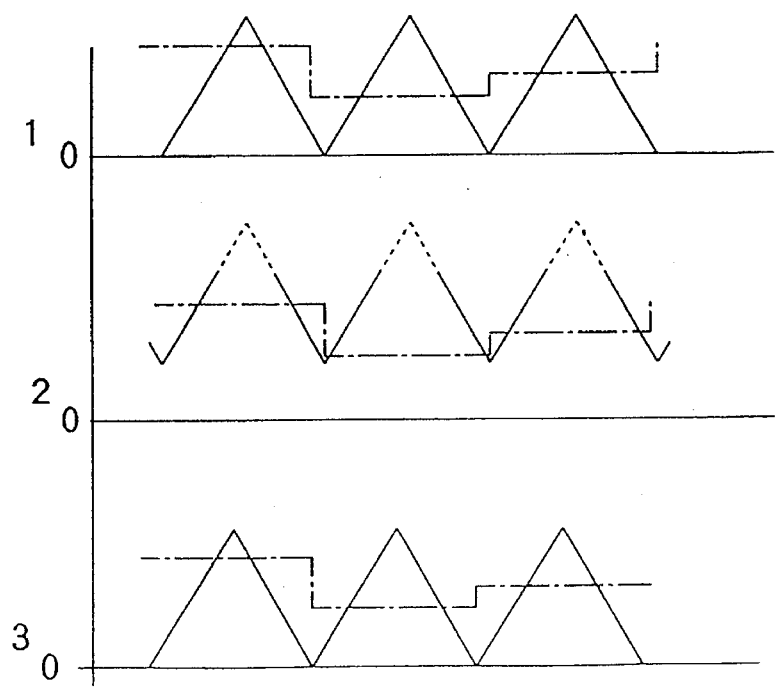
FIG. 25 is a diagram showing an example of a triangular wave which is a reference wave of a halftone reproduction area in the third example.
Figure 26:
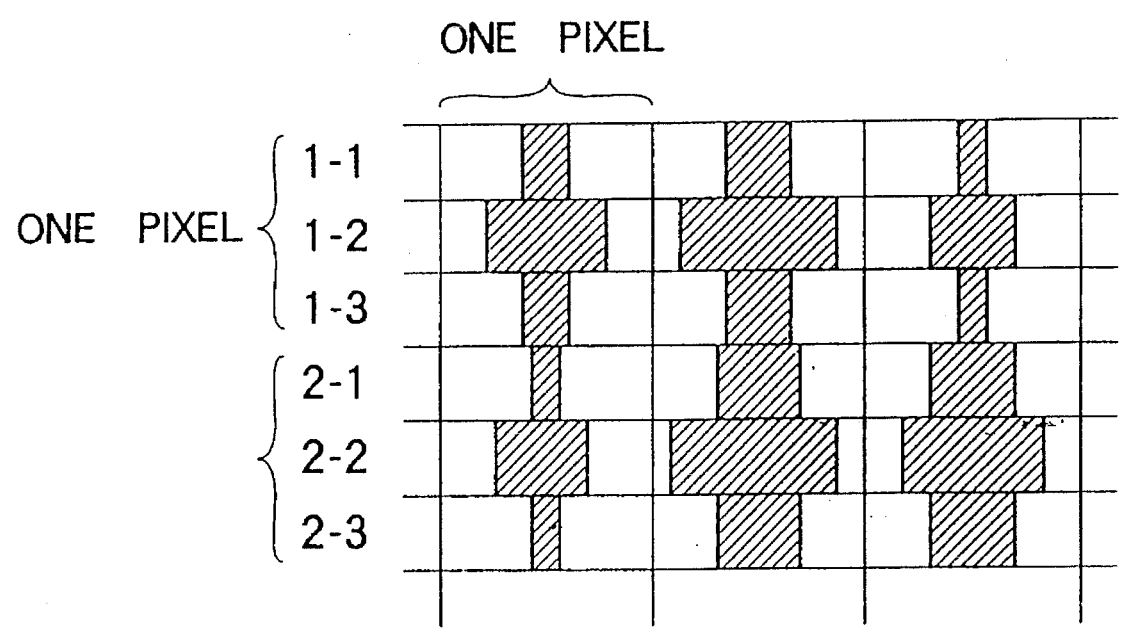
FIG. 26 is an illustrative diagram wherein a latent image in a halftone reproduction area is formed by modulation signals in the third example.

When image discrimination circuit 241 judges to be a halftone reproduction area, select circuits 250A–250C output all reference triangular waves to the modulation circuits 260A–260C because the result of edge detection shows "0". With signals of the image discrimination circuit 231, however, DC component adding circuit 292 sends to select circuit 250B the triangular wave wherein predetermined DC components are added to a reference triangular wave. FIG. 25 shows each reference wave in the above case, and one-dot chain lines show image density signals. As a result, an electrostatic latent image formed on photoreceptor 401 takes a form that is close to a rhombic form wherein a recorded width at a central portion is long as shown in FIG. 26, and uniform halftone images having no longitudinal stripes are obtained.

Though the image processing circuits mentioned above have been explained with an example of a laser printer, the invention is not limited only to this. When the image data processing circuit 100 is replaced with image data processing circuit 150 comprising color scanner 151, A/D converting circuit 152, density conversion circuit 153, and masking UCR circuit 154 so that the image data processing circuit may take charge of input of image density data from the scanner and of image processing, it may be applied to other image forming apparatus such as a copying machine or the like.

Figure 27:
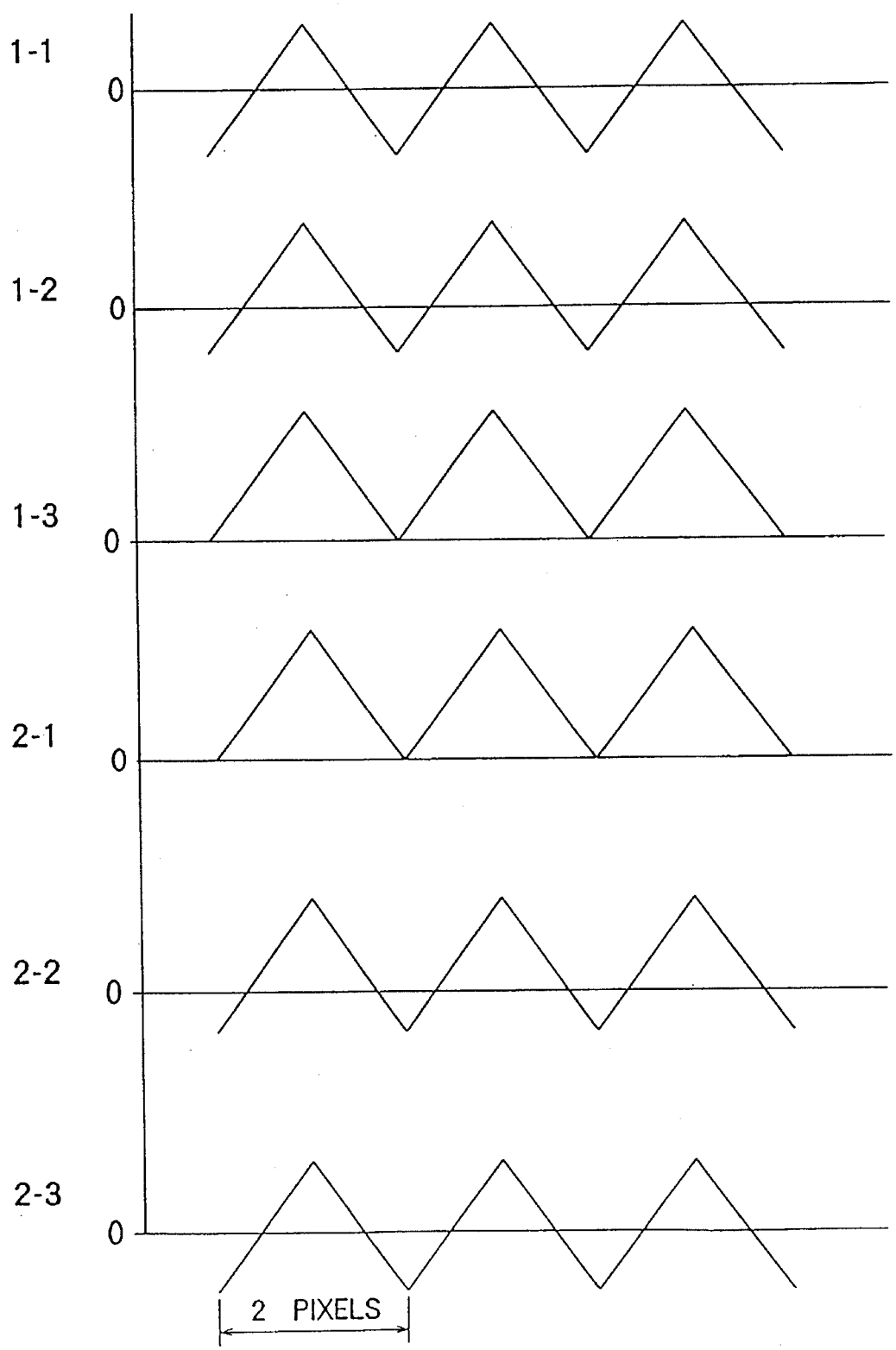
FIG. 27 is a diagram showing a reference wave used in the fourth example of the invention.
Figure 28:
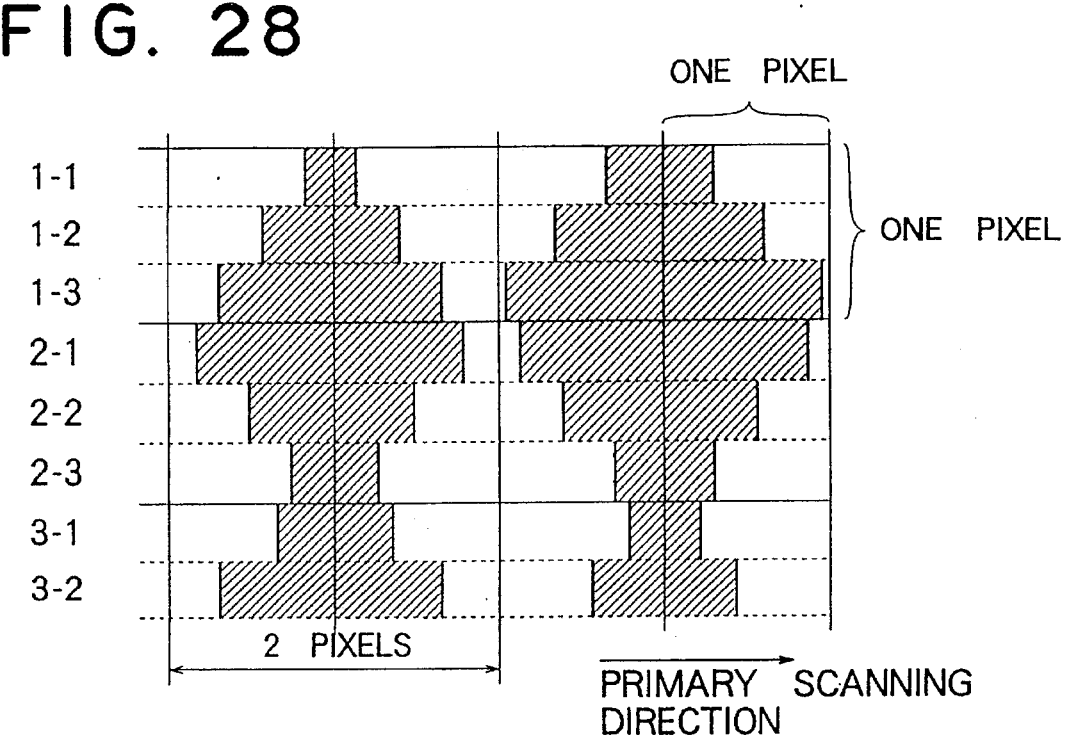
FIG. 28 is a diagram showing an electrostatic latent image in the fourth example of the invention.

FIG. 27 represents a diagram showing a reference wave of a halftone reproduction area used in the fourth example of the invention. With regard to a cycle of the reference wave, one cycle corresponds to two pixels and its DC component grows greater as a scanning line advances in the sequence of 1-1, 1-2 and 1-3, while, the DC component decreases as the next scanning line advances in the sequence of 2-1, 2-2 and 2-3, which repeats. The reference wave of a character reproduction area is the same as in the third example, and its cycle corresponds to one pixel. As a result, an electrostatic latent image of a halftone reproduction area formed takes a rhombic form close to a halftone dot as shown in FIG. 28 and further uniform halftone images having no longitudinal stripes are obtained. The reference wave of a character reproduction area is the same as in the third example, and a recording position is modulated and a profile may be reproduced sharply.

The fifth example is the same as the third example as far as a character reproduction is concerned. In a halftone reproduction area, however, dots corresponding to a halftone dot with a screen angle can be formed through a means wherein a plurality of reference waves having different phases are used for modulation of recording positions. For example, it is possible to improve color uniformity and to prevent occurrence of moire fringes with screen angles of 45° for a yellow image, 26.6° for a magenta image, –63.4° for a cyan image and 0° for a black image.

Figure 29:
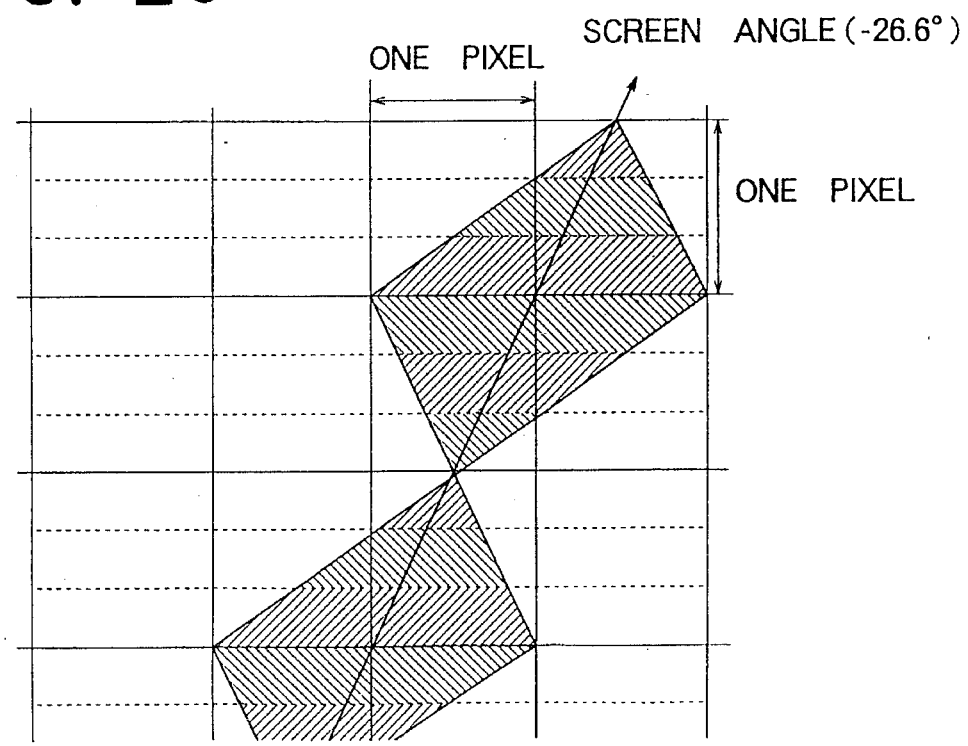
FIG. 29 is a diagram showing an electrostatic latent image in the fifth example of the invention.

In the case of a screen angle of 26.6°, it is possible to form a dot corresponding to a halftone dot with a screen angle of –63.4° as shown in FIG. 29 in a method wherein one cycle corresponds to two pixels for a cycle of a reference wave (in the case of the aforementioned cyan image and magenta image), DC component grows greater as a scanning line advances in the sequence of 1-1, 1-2 and 1-3, while DC component decreases as lines move in the order of 2-1, 2-2 and 2-3, and a reference wave whose phase is advanced by the increment of 1/12 cycles is used for each step of line.

When a reference wave whose phase is delayed by increment of 1/12 cycles is used, a dot image corresponding to a halftone dot with a screen angle of 26.6° may be formed. When a reference wave whose phase is delayed by increment of 1/6 cycles is used, a screen angle of 45° may be obtained.

The present invention provides, as described above, an image forming apparatus comprising a semiconductor laser array oscillated by image density data modulated by reference wave signals to form an electrostatic latent image on an image forming member, wherein there is provided a modulation means in which a size of a recording dot and a recording position in the primary scanning direction are changed depending on image density by combining selectively image density data and a reference wave with a different phase based on an edge detection circuit and its detection results, and a dot in a rhombic shape is formed by changing DC components of a reference wave used or causing one cycle to correspond a plurality of pixels, so that an image formed by Scanner, CG and font data may have no longitudinal stripes and have high sharpness to be an excellent image.

It is further possible to enhance the effect of the invention by scanning the aforementioned one pixel with a plurality of recording beams and by using a high γ photoreceptor.

What is claimed is:

1. An apparatus for forming a color image of pixels each having plural color components, wherein a latent image is formed by an image dot for each color component in an imaging unit area for each pixel on an image carrier, each imaging unit area having plural dot forming positions, the apparatus comprising:

(a) light generating means for generating pulse-width modulated scanning light to expose the image carrier;

(b) image discriminating means for discriminating whether an objective pixel belongs to a halftone image area or a character image area, based on density data obtained from an image density distribution of the objective pixel and of pixels adjoining the objective pixel;

(c) means for generating a first reference wave signal having a predetermined cycle and a second reference wave signal having a cycle longer than the predetermined cycle of the first reference wave signal; and (d) means for modulating the dot forming positions of the scanning light in a scanning direction according to said first and second reference wave signals, wherein the image discriminating means selects the second reference wave signal when the objective pixel is discriminated to be a halftone image area, and wherein the image discriminating means selects the first reference wave signal when the objective pixel is discriminated to be a character image area, the first reference wave signal for the objective pixel being shifted, in accordance with the image density distribution, toward a pixel adjoining the objective pixel having an image density more than that of the objective pixel, so as to determine the dot forming position of the image dot within the imaging unit area of the objective pixel.

2. The apparatus of claim 1, wherein said first reference wave signal includes a plurality of reference signals which are shifted relative to each other by a predetermined phase, and wherein one of said plurality of reference signals is selected when said first reference wave signal is selected.

3. The apparatus of claim 1, wherein said image density distribution is obtained in a manner such that the objective pixel is divided into small pixels each having a predetermined width and length, and density data of the objective pixel and pixels adjoining the objective pixel are replaced with density data of said small pixels in the objective pixel.

4. The apparatus of claim 1, wherein said image discriminating means discriminates the objective pixel to be a character area when a change of density data of the imaging unit area is large, and discriminates the objective pixel to be a halftone area when the change of density data is small.

5. The apparatus of claim 1, wherein g cycle of the second reference wave signal for the halftone image area comprises a plurality of pixels.

6. The apparatus of claim 5, wherein, when said objective pixel is discriminated to be a halftone image area, the modulating means modulates the dot forming positions using the second reference wave signal having a cycle corresponding to two pixels.

7. The apparatus of claim 1, wherein a phase of each of the first and second reference wave signals differs for each of the color components.

* * * * *